(12) United States Patent
Palatov

(10) Patent No.: US 12,278,913 B2
(45) Date of Patent: Apr. 15, 2025

(54) APPARATUS AND METHODS FOR MANAGEMENT OF CONTROLLED OBJECTS

(71) Applicant: Dennis Palatov, Portland, OR (US)

(72) Inventor: Dennis Palatov, Portland, OR (US)

(73) Assignee: METALINXX, INC., Portland, OR (US)

( * ) Notice: Subject to any disclaimer, the term of this patent is extended or adjusted under 35 U.S.C. 154(b) by 526 days.

(21) Appl. No.: 17/710,759

(22) Filed: Mar. 31, 2022

(65) Prior Publication Data

US 2022/0368541 A1    Nov. 17, 2022

Related U.S. Application Data

(63) Continuation-in-part of application No. 17/317,403, filed on May 11, 2021, now Pat. No. 11,477,027.

(51) Int. Cl.
*H04L 29/06* (2006.01)
*H04L 9/32* (2006.01)

(52) U.S. Cl.
CPC ................................ *H04L 9/3268* (2013.01)

(58) Field of Classification Search
CPC .................................................... H04L 9/3268
See application file for complete search history.

(56) References Cited

U.S. PATENT DOCUMENTS

| | | | |
|---|---|---|---|
| 10,223,695 B2 | 3/2019 | Bhagavatula et al. | |
| 10,505,741 B1 | 12/2019 | Conley | |
| 10,686,779 B2 | 6/2020 | Glozman et al. | |
| 10,963,575 B2 | 3/2021 | Wang et al. | |
| 2011/0191590 A1* | 8/2011 | Darbellay | G06F 21/645 |
| | | | 713/175 |
| 2015/0324798 A1 | 11/2015 | Kai et al. | |
| 2020/0028848 A1* | 1/2020 | Gupta | G06F 21/105 |
| 2020/0216084 A1 | 7/2020 | Balachandran et al. | |
| 2020/0245144 A1* | 7/2020 | Sandu | H04W 12/50 |
| 2021/0118085 A1 | 4/2021 | Bushnell et al. | |

FOREIGN PATENT DOCUMENTS

WO    2019242947 A1    12/2019

\* cited by examiner

*Primary Examiner* — Evans Desrosiers
(74) *Attorney, Agent, or Firm* — Mohr Intellectual Property Solutions, PC

(57) ABSTRACT

A lifecycle management system for Controlled Objects is disclosed using a plurality of distinct databases in a plurality of domains. Methods for associating identifiable data records with identifiable Controlled Objects are disclosed. Methods and apparatus are disclosed for authorizing and recording use of a Controlled Object, including pairing of a plurality of Controlled Objects.

5 Claims, 18 Drawing Sheets

APPARATUS AND METHODS FOR MANAGEMENT OF CONTROLLED OBJECTS

PRIORITY CLAIM

This application is a Continuation In Part of the co-pending application APPARATUS AND METHODS FOR MANAGEMENT OF CONTROLLED OBJECTS Ser. No. 17/317,403, filed on May 11, 2021, which is incorporated herein by reference in its entirety

BACKGROUND OF THE INVENTION

A wide variety of objects having a useful function are manufactured, commercially distributed, placed into commercial, government or consumer use, and eventually retired from service and disposed of or recycled. Increasingly, the useful function of such objects is substantially under the control authority of an electronic controller. Embodiments of such objects include, but are not limited to, vehicles, computing devices, communications devices, and the like. Such objects are collectively and interchangeably referred to herein as Controlled Objects.

As used herein, the term Controlled Object refers to any physical object having a Useful Function material aspects of which are under control authority of an electronic controller, said Useful Function being substantially the purpose and functionality for the performance of which the physical object is designed, manufactured, operated and maintained.

A Material Aspect is a subset of the overall Useful Function that is material to the performance of the Useful Function and which, if hindered or restricted, will result in a corresponding hindrance or restriction of the Useful Function. For example, the Useful Function of a Controlled Object that is a vehicle is transport of people or cargo. Material Aspects of the Useful Function of the vehicle may include the control of the drivetrain to facilitate or inhibit movement of the vehicle, the control of the door locking mechanisms to facilitate or inhibit ingress and egress of occupants and cargo, the control of the admission of stored energy such as liquid fuel or electric energy to facilitate or inhibit the ability to operate the drivetrain, and the like. For a Controlled Object that is a communications device such as a cellular phone, the associated Useful Function is the facilitation of electronic communication between two or more persons or other Controlled Objects. Material Aspects of such Useful Function for the communications device may be establishing a network connection, establishing a call, converting sound pressure waves to digital information, packaging the digital information for transport over the network, converting received digital information into sound pressure waves, configuring a display screen to present a user interface, and the like.

In the prior art, distinct facets of a Controlled Object's useful life cycle are managed in distinct domains, non-limiting examples and details of which are discussed in the following paragraphs and diagrammatically shown in FIG. 1 for the purpose of illustrating the background of the present invention. The illustrated domains are grouped herein into distinct categories illustrated as the categories of Manufacture, Use and Compliance.

Domains in the Compliance category pertain to entities and transactions ensuring the compliance of specifications, features and use of Controlled Objects with applicable Government regulations, industry standards and the like. Various Government and other regulatory entities are associated with domains in the Compliance category. Such entities may participate in National, Federal, State and local Government domains and may include government organizations and agencies, as well as industry standards organizations. An illustrative example of a Compliance domain is a Federal domain comprising various Federal Government regulatory agencies and organizations such as Federal Aviation Administration, National Highway Traffic Safety Administration and the like. Another illustrative Compliance domain is the State Government domain, comprising state regulatory and enforcement agencies such as state Departments Of Motor Vehicles, state Highway Patrol organizations and the like.

Domains in the Manufacture category pertain to entities and transactions relevant to the manufacture, assembly, repair, maintenance and disposal of Controlled Objects. Examples of Manufacture domains illustrated herein include Component and Product domains.

In an illustrative Component domain, which is a domain in the Manufacture category, the raw materials and the components necessary to manufacture the complete Controlled Object are produced by participating entities in the domain, tested and delivered to other entities in the Product domain. Various component certifications, design criteria, quality control tests and regulatory requirements must be complied with and recorded. In prior art, records of such compliance are kept by the individual vendors in proprietary databases and exchanged as needed between manufacturers and purchasers of Components. Reports are made periodically to Government entities and records may be from time to time audited by Government entities. Embodiments of Components include but are not limited to electronic integrated circuits (ICs), electronic controllers, electronic assemblies, drivetrain components, battery cells, battery modules, and the like.

In an illustrative Product domain, which is a domain in the Manufacture category, the necessary Components are received from the Component domain by entities participating in the Product domain and assembled to create a useful Controlled Object which is a Product. In a non-limiting example, an electronic controller is a Component of a Controlled Object that is a Product. The Controlled Object that is a Product is assigned a unique Product Identifier (PID). Embodiments of PIDs include but are not limited to Vehicle Identification Numbers (VINs), Product Identification Numbers (PINs), Serial Numbers, Media Access Controller (MAC) addresses, Subscriber Identity Modules (SIMS) and the like. Various Product certifications, design criteria, quality control tests and regulatory requirements must be complied with and recorded. In the prior art, records of such compliance are kept by the manufacturers of Products in proprietary databases and exchanged as needed between manufacturers and purchasers of Products. Reports are made periodically to Government entities and records may be from time to time audited by Government entities.

Domains in the Use category pertain to entities and transactions relevant to the exercise of the Useful Function of Controlled Objects. Illustrative examples of Use domains include Commerce and Consumer domains.

A completed Controlled Object that is a Product is released for distribution and service to entities participating in an illustrative Commerce domain, which is a domain in the Use category, by delivering the Controlled Object to a dealer, distributor, or a commercial operator (collectively and interchangeably referred to herein as Commercial entities) that may use the Controlled Object to provide a service or for other commercial purposes. In the Commerce domain, a Controlled Object is subject to commercial transactions which may include but are not limited to sale, lease, hire and the like. Records of commercial transactions are kept by dealers, distributors and commercial operators in proprietary databases. Reports are made periodically to various Government entities, accounting entities, management entities and the like. Data and records may be, from time to time, audited by such entities.

In some embodiments, Controlled Objects are further released to entities participating an illustrative Consumer domain, which is a domain in the Use category, by being offered for sale, lease or hire by commercial entities to individual consumers. Records of consumer transactions are kept by dealers, distributors and commercial operators in proprietary databases. Reports are made periodically to various Government entities, accounting entities, management entities and the like. Data and records may be, from time to time, audited by such entities.

In an illustrative Federal Government domain, which is a domain in the Compliance category, various Government entities issue certifications, issue registrations, receive reports, perform audits, and assess taxes and fees to entities in all of the above listed domains. Records of transactions between Government entities and entities in all other domains are kept by Government entities in proprietary databases. Authorization Information may be made available on request to entities in other domains, such as verification of registration of title and the like. Such information is in some cases delivered by printed document via postal service.

Upon end of useful life of a Controlled Object, the object is dismantled or disposed of in the Commerce domain. Records of disposal transactions are kept by disposal facilities in proprietary databases. Reports are made periodically to various Government entities, accounting entities, management entities and the like. Data and records may be, from time to time, audited by such entities.

In prior art, the enforcement of compliance with regulatory and contractual requirements in the Component, Product and Commercial domains is primarily through legal processes.

In some prior art embodiments in the illustrative Consumer domain, the Controller of a Controlled Object is employed to enforce some consumer Transactions pertaining to use or configuring some aspects of the Useful Function of the Controlled Object, responsive to data contained in a proprietary database operated by the manufacturer or commercial operator of the Controlled Object. Such embodiments may include but are not limited to controlling communications network access by a communications Controlled Object responsive to its associated SIM being registered in the network operator's database. Other prior art embodiments include enabling features or performance capabilities of a vehicle or another Controlled Object responsive to information being stored in the manufacturer's database, for example recording the payment of a fee to enable such capabilities. Such prior art embodiments rely on the Controlled Object having an available network connection to the Authentication Controller accessing the associated database. Illustrative prior art embodiments include but are not limited to cellular phones with a valid user account, vehicles having a cellular modem with a cellular network account, and the like. Prior art transactions of Controlled Objects not having a network connection, and transactions of Controlled Objects directly between consumers are primarily enforceable through legal process.

In the prior art, there are no uniform automated methods to transfer information pertinent to an identifiable Controlled Object between the various proprietary databases operated by entities in each domain. Likewise, there are no uniform prior art methods for controlling or enforcing transactions directly between many types of dissimilar Controlled Objects that may be owned or operated by the same entity, whether in Commercial or Consumer domains.

FIG. 1 (PRIOR ART) diagrammatically illustrates prior art management systems for Controlled Objects. The illustrative Federal and State domains in the Compliance category are shown each having a plurality of entities, each entity having a proprietary database. The illustrative Component and Product domains in the Manufacture category are shown each having a plurality of entities, each entity having a proprietary database. The illustrative Commerce and Consumer domains in the Use category are shown each having a plurality of entities, each entity having a proprietary database. Data communication between the various databases are diagrammatically illustrated as taking place via communication links utilizing a plurality of proprietary communication protocols. A Controlled Object is diagrammatically shown having an electronic controller, said electronic controller being in communication with proprietary databases of entities in the Manufacture, Commerce and Consumer domains via communication links utilizing proprietary communication protocols. A plurality of such links are illustrated in FIG. 1 to show the possible connections that may be made. In the prior art, a single Controlled Object customarily has only one of the illustrated plurality of links.

In the prior art, databases and communication protocols for accessing them are kept proprietary in order to maintain security and control of the access. This plurality of proprietary systems, as illustrated in FIG. 1, makes the reporting and auditing of data cumbersome, time consuming and inefficient. Consequently, rendering the Useful Function of a Controlled Object responsive to data stored in a database is customarily limited in the prior art to communication with a single database controlled by a single entity. An example of such communication is a Controlled Object that is a cellular phone communicating with the cellular service provider's proprietary customer subscription database via the service provider's proprietary communications network.

Another example of a single connection is a communications link between a vehicle's electronic controller and the vehicle manufacturer's proprietary database. Such links are utilized by some vehicle manufacturers to gather use data and provide periodic control program updates to the vehicle. If a safety recall for a vehicle is issued by a Government agency, the agency has no access to the manufacturer's database or the communications link to the vehicle. The Government agency must therefore contact the manufacturer of the vehicle (Manufacture entity). The manufacturer of the vehicle must then contact dealers (Use entities) and state Departments of Motor Vehicles (Compliance entities) in order to obtain information necessary to notify the vehicle owner of the need for service. The vehicle owner may or may not be the vehicle User. Such notifications are often made via printed letters delivered by postal service, and may take significant time to reach the vehicle owner. During this time, the safety issue that necessitated the recall continues to pose a risk to the vehicle user.

What is needed in the arts of Controlled Objects is a system, apparatus and method to uniformly and in a timely manner communicate records of transactions, and to generate and make available Authorization Data pertaining to Controlled Objects, such records and Authorization Data being securely shared between the associated databases in multiple distinct domains. There is a further need to utilize the control authority of an electronic controller of a Controlled Object over the Material Aspects of the object's Useful Function to facilitate and enforce the use of Controlled Objects in accordance with records of transactions and Authorization Data being stored in a plurality of databases in a plurality of domains.

SUMMARY OF THE INVENTION

A first objective of the present invention is to provide a system, apparatus and method of rendering at least a Material Aspect of a Controlled Object's Useful Function responsive to Authorization Data stored in at least a first database associated with a first domain, and to further provide a system, apparatus and method of rendering at least a Material Aspect of a Controlled Object's Useful Function responsive to Authorization Data stored in a second database associated with a second domain.

A second objective of the present invention is to provide a system, apparatus and methods of securely delivering Authorization Certificates to Controlled Objects including Controlled Objects having a network connection that is Periodic, Intermittent or Indirect, said Authorization Certificates being generated responsive to Authorization Data stored in a database.

A third objective of the present invention is to provide a system, apparatus and methods for reporting historical Use Data of a Controlled Object to an authentication controller for the purpose of storing such Use Data in a database associated with a domain.

A Controlled Object having a Useful Function, and further having a plurality of Programmed States is disclosed, including at least a Passive State and at least an Active State. Programmed States are embodied by the execution of a control program by the Controlled Object's electronic controller, causing the electronic controller to exercise control authority over at least a Material Aspect of the Controlled Object's Useful Function. Material Aspects of a Controlled Object's Useful Function are disclosed as being Authorizable or Inherent. In some Programmed States, some Material aspects are Authorizable and some are Inherent. Same Material Aspects may be Authorizable in one Programmed State and Inherent in another Programmed State.

Transitions between Programmed States are disclosed as Controllable Events. Controllable Events that comprise Authorizable aspects of a Controlled Object's Useful Function may be responsive to obtaining Authorization Certificate from an authentication controller, said authentication controller accessing at least a database to retrieve or generate Authorization Data for generating said Authorization Certificate. Embodiments are disclosed wherein an authentication controller accesses a plurality of databases, each said database being associated with a distinct domain.

A system is disclosed comprising an Authentication Controller accessing at least a database, a Controlled Object having an electronic controller, and a Control Program for embodiment by the electronic controller a plurality of Programmed States of the Controlled Object and the Authorizable transitions between said Programmed States.

The use of Authorization Data to generate Authorization Certificates for authorizing transitions between Programmed States is disclosed. The delivery of Authorization Certificates is disclosed as being Prior, Concurrent, or Subsequent.

A system having a plurality of authentication controllers each accessing associated databases in a plurality of domains to retrieve or generate Authorization Data pertaining to each domain is further disclosed.

BRIEF DESCRIPTION OF THE DRAWINGS

The present invention is described herein with reference to the following drawings. The components in the drawings are not necessarily to scale relative to each other. Like reference numerals designate corresponding parts throughout the several views.

FIG. 9 further illustrates the data associations between the Controlled Object and the associated data records in the illustrated databases.

DETAILED DESCRIPTION

Figure 1:
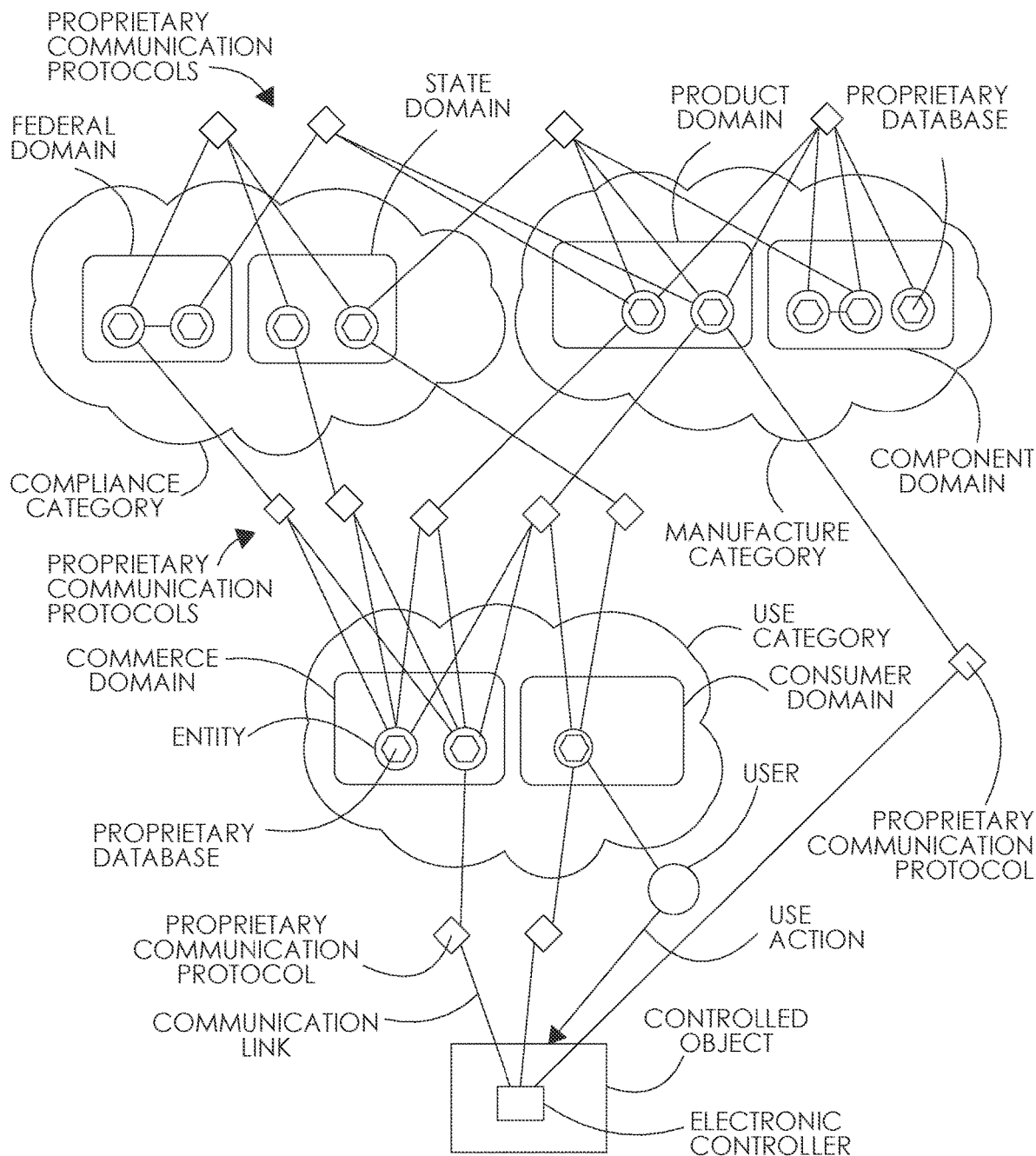
FIG. 1 (PRIOR ART) diagrammatically illustrates prior art management systems for Controlled Objects.
Figure 2:
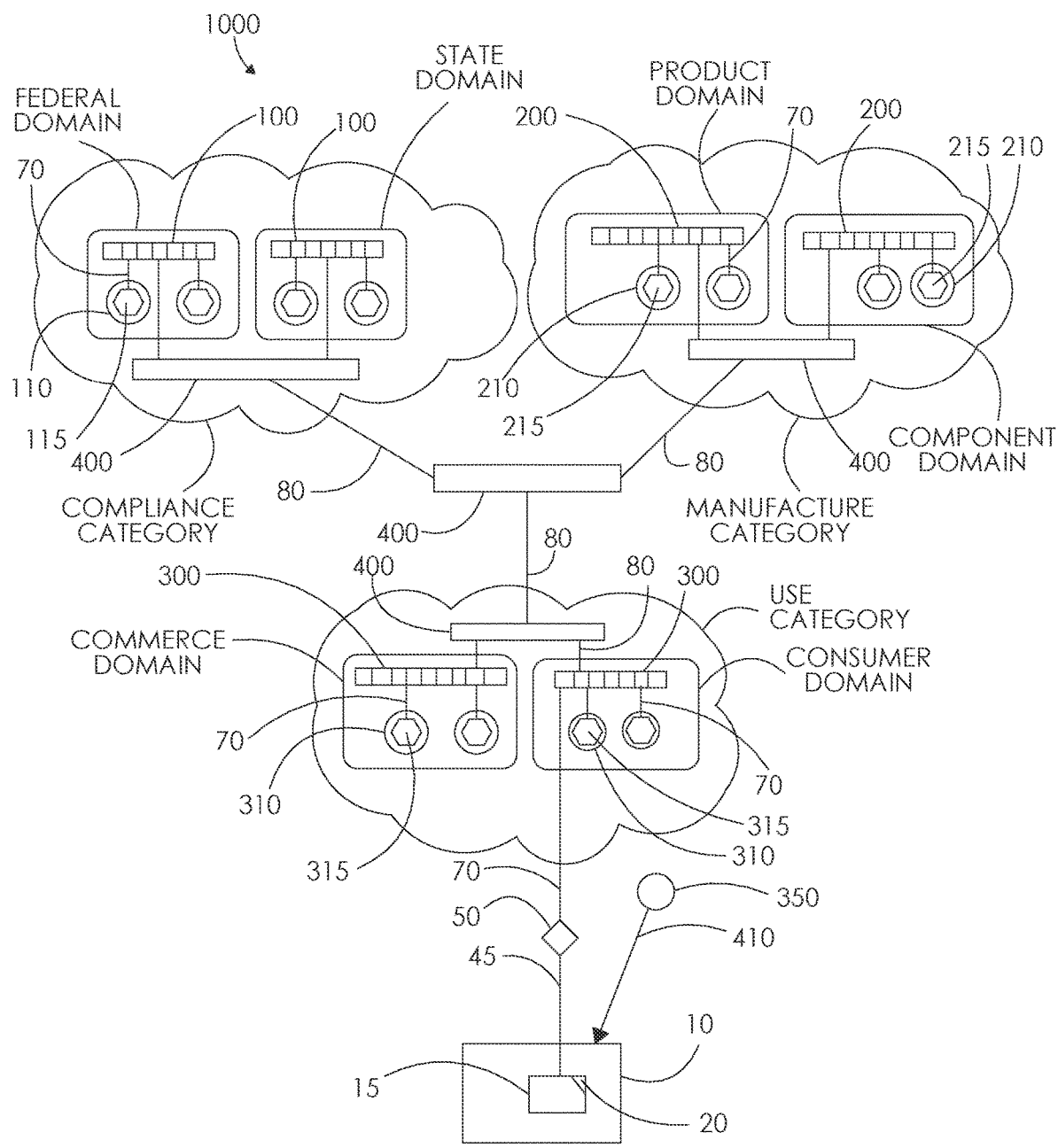
FIG. 2 is an illustrative diagram of an embodiment of a Controlled Object Management System of the present invention showing authentication controller accessing a Use category blockchain database.
Figure 3:
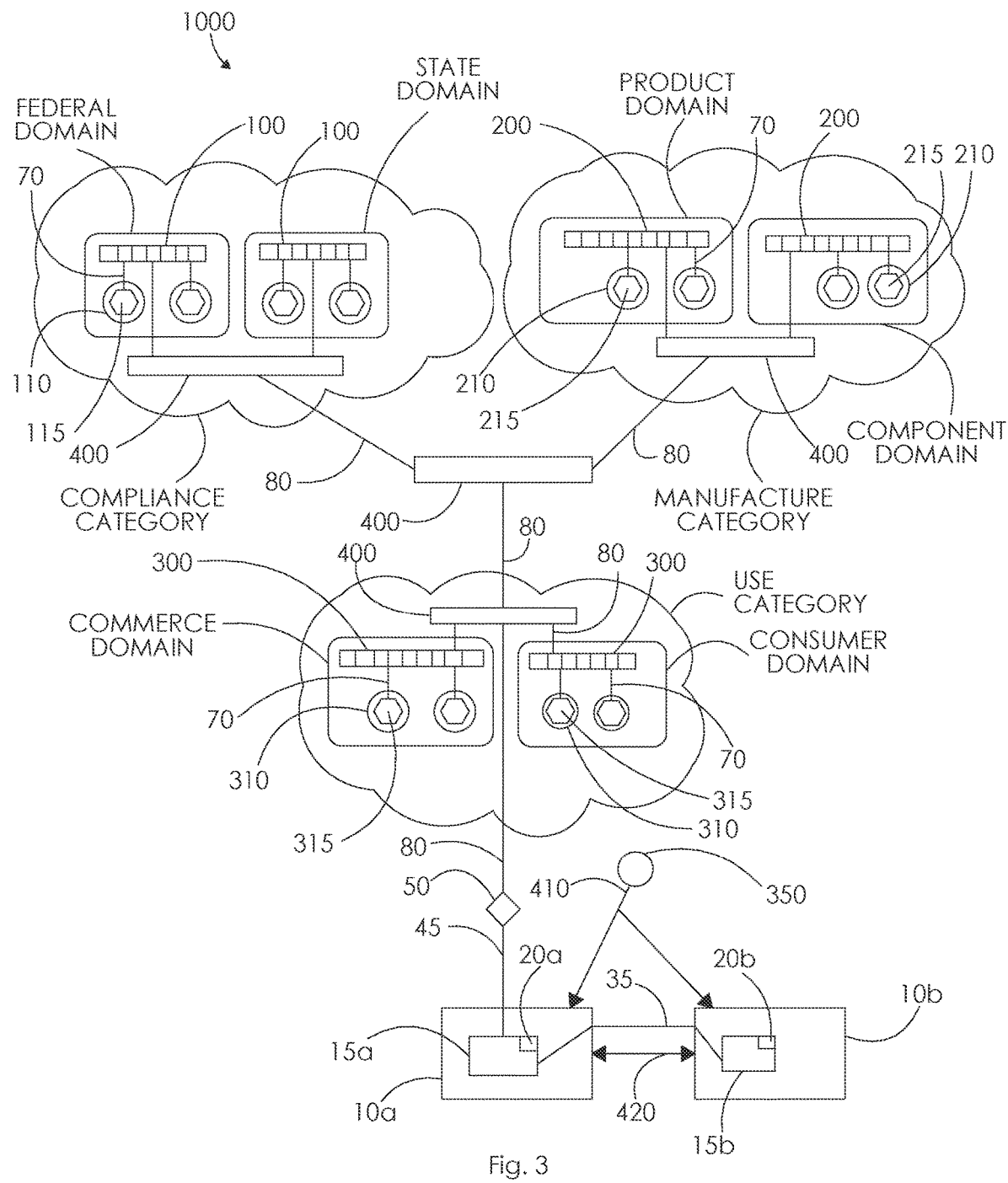
FIG. 3 is an illustrative diagram of an embodiment of a Controlled Object Management System of the present invention showing authentication controller accessing a plurality of blockchain databases in a plurality of domains via illustrative inter-domain protocol, and further showing paired Controlled Objects.
Figure 4:
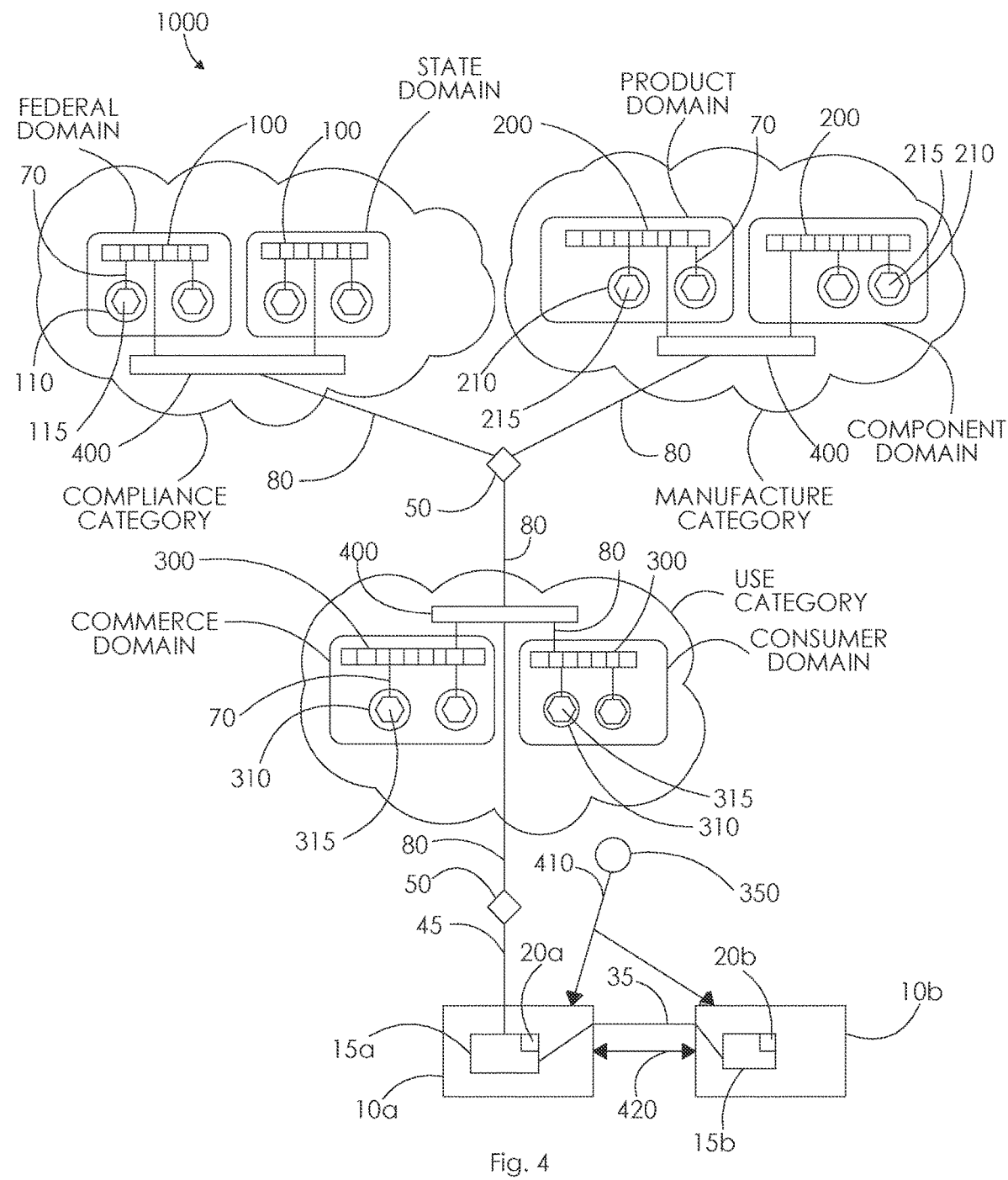
FIG. 4 is an illustrative diagram of an embodiment of a Controlled Object Management System of the present invention utilizing a plurality of authentication controllers, each accessing a plurality of blockchain databases in a plurality of domains via inter-blockchain communication links utilizing illustrative inter-domain protocol.

An embodiment of the Controlled Object Management System (COMS) 1000 of the present invention is diagrammatically illustrated in FIG. 2 accessing a plurality of databases utilizing blockchain technologies. The illustrated embodiment is not limiting, other embodiments utilizing other database technologies shall become apparent to those skilled in the art based on the disclosures made herein. Additional illustrative embodiments of the COMS 1000 are shown in FIG. 3 and FIG. 4, and are further described in detail herein below.

Throughout the following detailed description, a variety of examples for systems and methods for rendering Material Aspects of the Useful Function of a Controlled Object responsive to Authorization Data stored in at least a database are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Communicatively coupled" means that an electronic device is in communication with another electronic device for the purpose of transmission of electronic messages, either wirelessly or with a connector, whether directly or indirectly through a communication network. As used herein, communicative coupling may be Immediate, wherein the transmission and receipt of electronic messages is substantially instantaneous. Communicative coupling may be Periodic, wherein electronic messages are transmitted and received substantially responsive to a predetermined schedule. Communicative coupling may be Intermittent, wherein the connections necessary for transmission and receipt of electronic messages are established on demand or on as-available basis. Communicative coupling may be Indirect, wherein an electronic message is transmitted by a first electronic device to a second electronic device for subsequent relay or transmission of substantially the electronic message from the second electronic device to a third electronic device, and wherein said relay or transmission may be at a later time.

"Controllably coupled" means that an electronic device controls operation of another electronic or electromechanical device.

"Secure communication", "secure message" means communication by means of an encrypted message, or any other type of message that deters reading, modification or falsification by unauthorized parties or devices. Any type of known encryption may be utilized, including public key, private key, digital signing and the like. Different types of secure communication may be utilized within an embodiment for different types of messages. Encryption and decryption of messages may be carried out in software and may be carried out with hardware assist in controllers so equipped. Secure communication is well known in the arts of electronic devices and is therefore not described in detail herein.

"Unique ID", "unique identifier" means a numeric or alphanumeric value that is generated to be unique and assigned to a specific physical device such as an electronic circuit, electronic assembly, a computing resource, or a machine which may be a vehicle. Generation and assignment of unique identifiers is well known in the arts. Registration of unique identifiers in a database is also well known. For vehicles, the unique identifier typically takes the form of a Vehicle Identification Number (VIN). Various types of electronic circuits are known which have unique ID assigned and imbedded in them at the time of manufacture, such as controllers, processing units, networking controllers and the like. Assigning a unique identifier to an electronic device is known in the arts of electronic device design and is therefore not described in detail herein. Assignment of unique IDs to computing resources, such as assignment of Universal Resource Locators (URLs) is likewise known.

"Product Identification Number", "PIN" means a unique ID that is officially assigned and registered to a Controlled Object that is a Product by the manufacturer of the Controlled Object. A PIN may be numeric or alphanumeric. A Controlled Object is rendered identifiable by the assignment of a PIN to the Controlled Object. Transactions pertaining to Controlled Objects within domains in Use and Compliance categories make reference to the PINs associated with Controlled Objects. Likewise, cross-domain transactions pertaining to Controlled Objects make reference to the associated PINs. Transactions within domains in Manufacture category may or may not make reference to PINs. A reference to a PIN may be direct or indirect. An indirect reference to a PIN may refer to an identifier or address of a unique data record in a database, such as a Token, said record being associated with a PIN or a grouping of PINs.

"Vehicle Identification Number", "VIN" is a specific type of PIN and means a unique ID that is officially assigned and registered to a Controlled Object that is a vehicle by the vehicle manufacturer. A VIN is customarily recorded in a database by a Government entity.

"Vehicle Control Unit", "VCU" means an electronic controller which is controllably coupled to, and controls the operation of, vehicle electronic and electromechanical systems responsive to operator inputs and other Monitored Conditions.

"Computing resource" means one or more computer processing units having a network connection to receive and transmit data. A computing resource may comprise any combination of Central Processing Units (CPUs), Graphics Processing Units (GPUs), Neural Processing Units (NPUs), communications networks, data storage devices, and the supporting apparatus, algorithms and computer programs. A computing resource may be geographically distributed, with components being communicatively coupled by private or public communications networks. A computing resource may have a unique identifier which may be a Universal Resource Locator (URL), an Internet Protocol (IP) address, or the like. A computing resource may be associated with a domain, a sub-domain, or a plurality of domains.

"Authentication controller" means an electronic device or computing resource having a means to authenticate whether an attempted use of a Controlled Object, and in particular an Authorizable Aspect of its Useful Function, is authorized. An authentication controller may have a unique identifier which may be a Universal Resource Locator (URL). An authentication controller may further comprise an access processor accessing a database. An illustrative non-limiting embodiment of an authentication controller 50 is diagrammatically shown in FIG. 8. In the illustrated embodiment, the authentication controller 50 is shown having an access processor 51, which may be a computing resource, said access processor 51 having a unique identifier which is a URL 5101. In the descriptions and disclosures made herein, the URL 5101 is interchangeably associated with the authentication controller 50 and the access processor 51 comprised therein.

Figure 8:
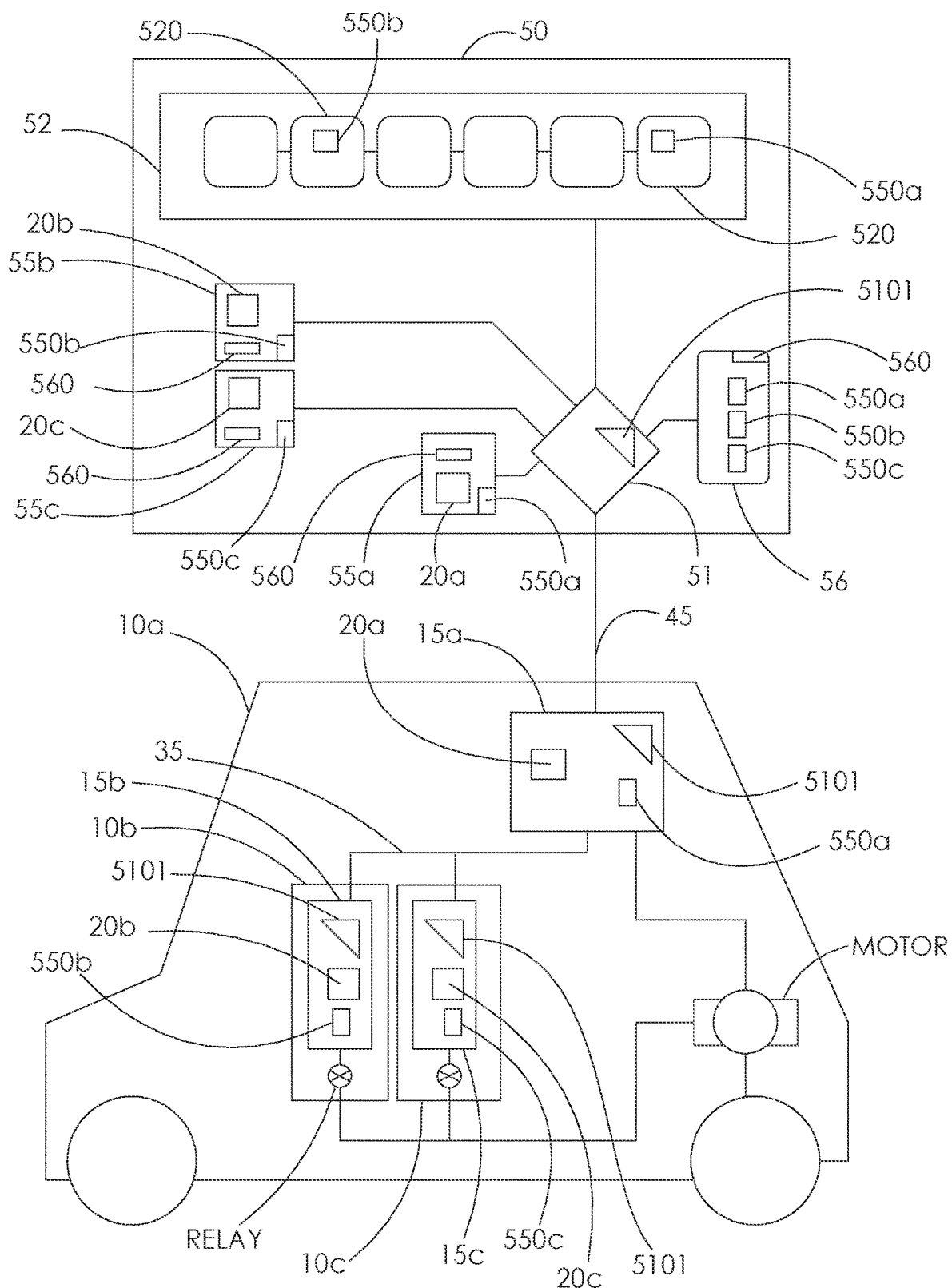
FIG. 8 illustrates a Controlled Object which is an electric vehicle having two Controlled Objects which are removable battery modules, said Controlled Object being communicatively coupled to an authentication controller.

The authentication controller 50 shown in FIG. 8 is illustrated having data records comprising a ledger 52, a plurality of Tokens shown as 55a, 55b, and 55c, and a Wallet 56. It should be understood that embodiments of authentication controller 50 accessing one or more external databases containing like records are possible without departing from the scope of the present invention. Non-limiting examples of such embodiments are illustrated in FIGS. 2-4 and FIGS. 9-13. FIG. 4 further illustrates a Controlled Object Management System having a plurality of authentication controllers 50.

"Authorization Data" is data that pertains to the authorization of a Controlled Object to transition from a first Programmed State to a second Programmed State. In embodiments of the system disclosed herein, including those not utilizing blockchain technologies, Authorization Data may be explicitly stored in a database accessed by an authentication controller, indicating authorization of an identifiable Controlled Object to transition between specific Programmed States. For example, if an identifiable Controlled Object is reported via an Administrative Action as unfit for use or stolen, Authorization Data indicating in the negative may be recorded in one or more database record associated with the Controlled Object. If proof of control is provided pertaining to a specific Controlled Object or a group of Controlled Objects via another Administrative Action, Authorization Data indicating in the affirmative may be entered in one or more database records associated with each Controlled Object, and a further association may be made between the respective records.

In non-limiting illustrative embodiments employing blockchain technologies, Authorization Data may be obtained or generated by accessing the blockchain data structures pertaining to control and ownership of an identifiable Controlled Object. The terms 'ownership' and 'control' as they pertain to Controlled Objects and the associated blockchain Tokens are used interchangeably herein. A state transition of a Controlled Object may be represented by a corresponding transaction recorded in the associated blockchain data structures. In the context of the disclosures and claims made herein, Authorization Data indicates in the affirmative if proof of ownership and intent to transact are confirmed. If one or more predetermined conditions for a transaction are not met, Authorization Data is deemed to indicate in the negative.

Figure 10:
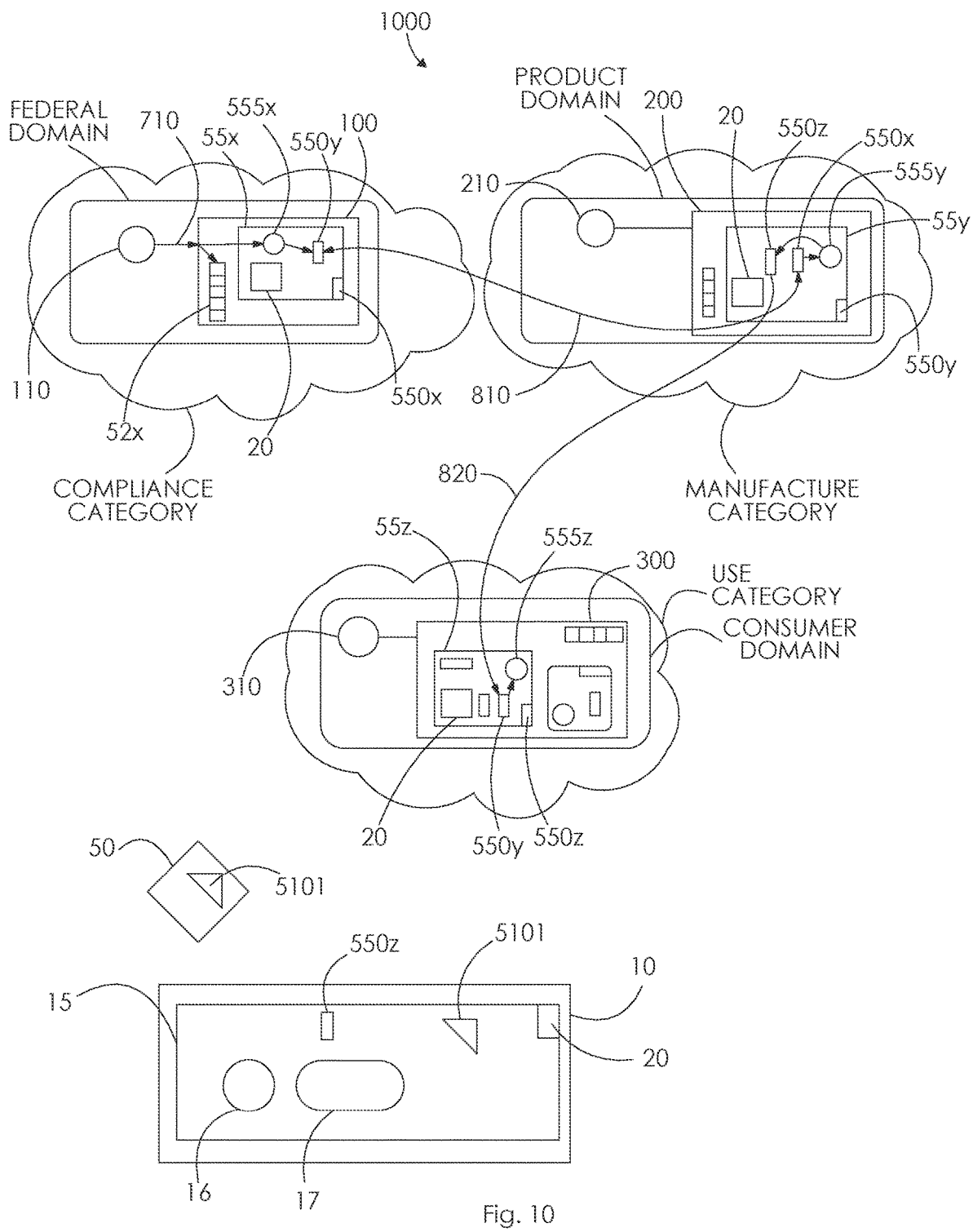
FIG. 10 diagrammatically shows the flow of information responsive to an Administrative action by an entity in a domain in the Compliance category.
Figure 11:
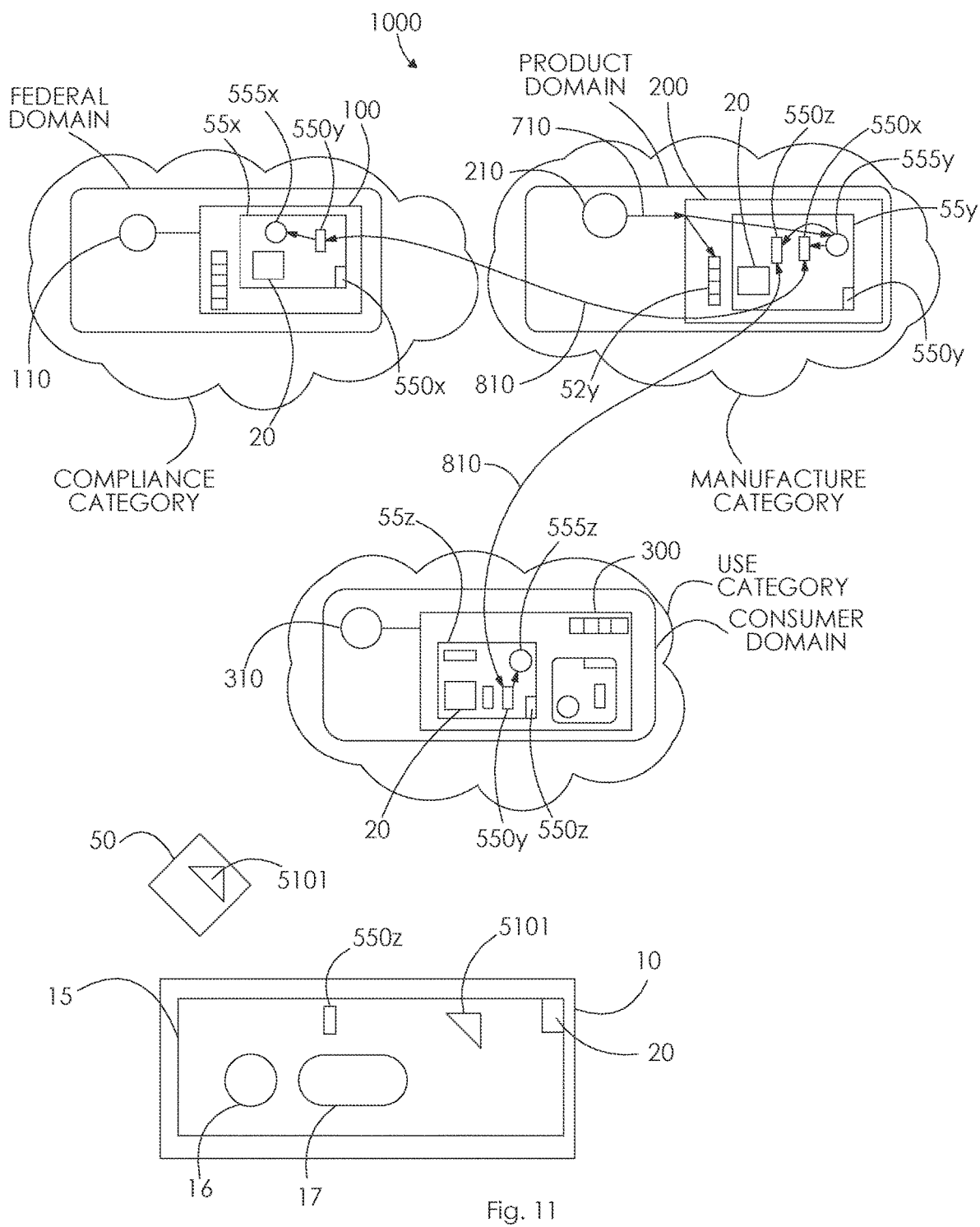
FIG. 11 diagrammatically shows the flow of information responsive to an Administrative action by an entity in a domain in the Manufacture category.
Figure 12:
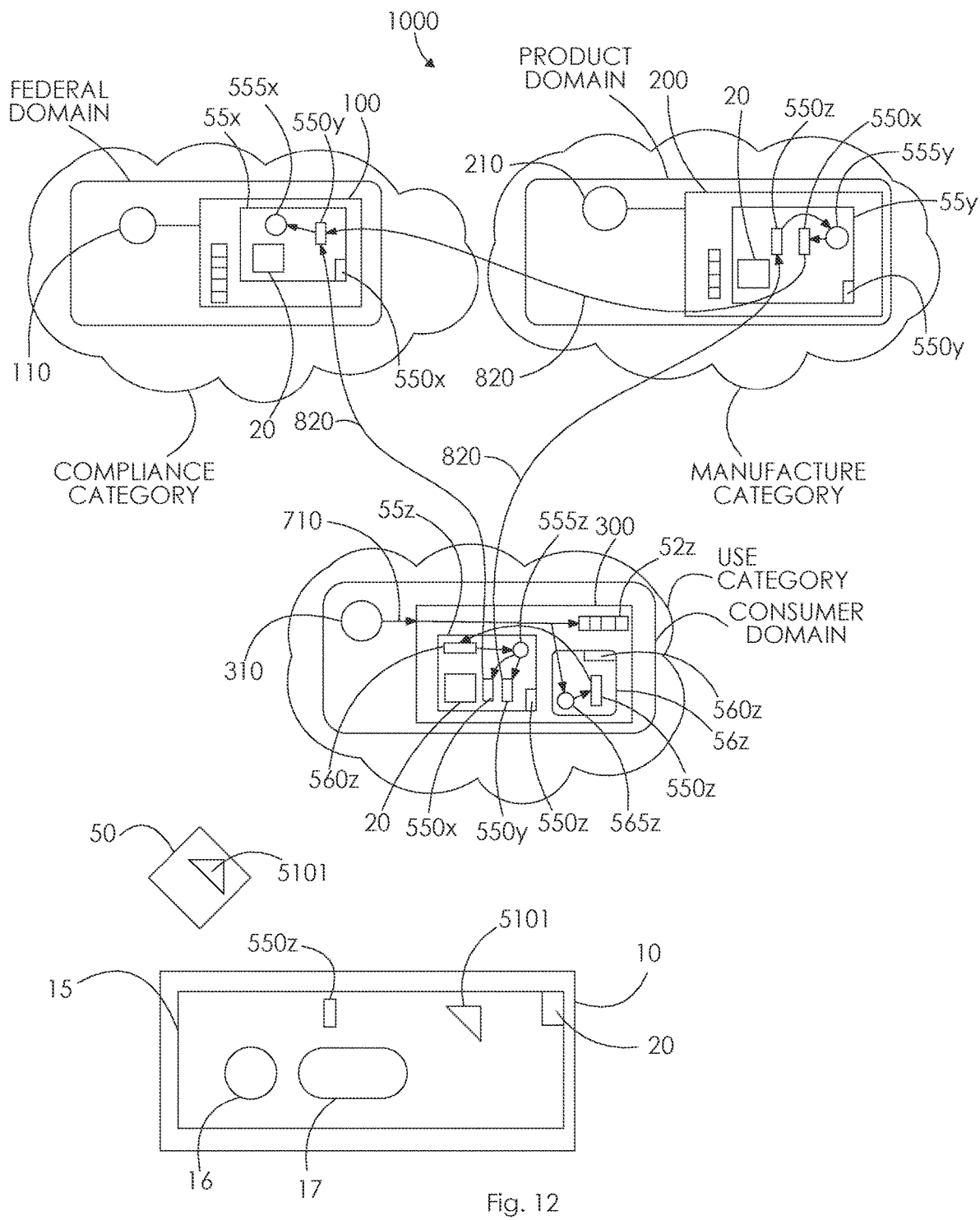
FIG. 12 diagrammatically shows the flow of information responsive to an Administrative action by an entity in a domain in the Use category.

As used herein, Authorization Data is said to originate in a domain when said Authorization Data substantially references data stored in a database of records of transactions pertaining to said domain. Such Authorization Data may be recorded responsive to an Administrative Action by an entity in the domain. Authorization Data originating in one domain may subsequently be transmitted to and stored in one or more databases associated with records of transactions pertaining to other domains. Non-limiting illustrations of such transmissions are shown in FIGS. 10-12, respectively showing Administrative Change 810 and Administrative Notice 820 being transmitted responsive to administrative action 710 originating in illustrative Federal, Product and Consumer domains, said transmissions resulting in modification of Authorization Data 555x, 555y and 555z stored correspondingly in data records of databases 100, 200 and 300. The transactions illustrated in FIGS. 10-12 facilitate Authorization Data originating in a first database in a first domain to be stored in a record in a second database which may be in another domain.

"Authorization Certificate", "Certificate" is a secure message for an identifiable Controlled Object, said secure message being generated by an authentication controller responsive to Authorization Data, said secure message being configured to be received and processed by an electronic controller of the Controlled Object. A Certificate may be generated using Access Data associated with the Controlled Object for which the Certificate is being generated.

"Access Data" is the data necessary to locate, identify and transact with (access) an identifiable Controlled Object or an identifiable data record such as a Token or a Wallet. Access Data as used herein comprises at least a unique identifier associated with the Controlled Object or data record. Access Data may further comprise but is not limited to one or more encryption keys, token addresses, database identifiers, block addresses, computing resource identifiers and other data necessary for secure access to database records, encryption and decryption of secure messages, and other secure communications in embodiments of the present invention. All such data is collectively and interchangeably referred to as Access Data herein. Varying embodiments utilize Access Data to securely access Tokens and blockchain ledgers that securely memorize varying operating states, transactions and data relating to an identifiable Controlled Object. Embodiments may further utilize Access Data associated with a Controlled Object to securely communicate with an electronic controller of the Controlled Object. It should be understood that specific references to Access Data may refer to only a subset of available Access Data, said subset being the portion of available Access Data that is pertinent to the reference being made. For example, in some references to Access Data, only the unique identifier portion of the available Access Data may be pertinent. It should be further understood that in references to Access Data being stored or transmitted, only the portion of the available Access Data that is pertinent and necessary to the specific reference may be stored or transmitted.

"Pairing" is the communicative or the communicative and physical coupling of two distinct identifiable Controlled Objects wherein the Useful Function of each of the paired Controlled Objects is exercised substantially simultaneously responsive to a single Use Action by a User. In the descriptions and disclosures made herein, paired Controlled Objects are communicatively coupled by a Pairing link, which may be any known communications link for communicatively coupling Controlled Objects. A Pairing Event is a Controllable Event wherein each of the paired Controlled Objects transitions to a paired programmed state. A non-limiting illustrative embodiment of a Pairing Event 902 is shown diagrammatically in FIG. 7.

In some embodiments, a Certificate generated responsive to a Pairing Event may contain data generated for, and readable only by, each of the paired Controlled Objects. In other embodiments, separate Certificates may be generated for each of the paired Controlled Objects. The Certificate data generated for a first of the paired Controlled Objects may comprise Access Data for the second of the paired Controlled Objects, and the Certificate data generated for the second of the paired Controlled Objects may comprise Access Data for the first of the paired Controlled Objects. A successful Pairing Event may be recorded in one or more of the associated database records corresponding to each of the paired Controlled Objects. Access Data for a first of the paired Controlled Objects is recorded in the memory of the electronic controller of the second of the paired Controlled Object, and Access Data for the second of the paired Controlled Objects is recorded in the memory of the electronic controller of the first of the paired Controlled Objects, creating the association between the two Controlled Objects. A Pairing may be revoked by erasing or otherwise invalidating the Access Data recorded responsive to the Pairing Event in at least one of the paired Controlled Objects, and in some embodiments by further erasing or otherwise invalidating the Access Data recorded responsive to the Pairing Event in the database record associated with said Controlled Object. In some embodiments a Pairing revocation may further be recorded in a ledger.

"Association" is the data correspondence between an identifiable database record and an identifiable Controlled Object, or between two distinct identifiable database records which may be comprised in the same database or in distinct databases, wherein the data is recorded in both the associated records, or both the associated record and the associated Controlled Object. Association as used herein between a database record and a Controlled Object is embodied by recording Access Data for the associated Controlled Object in the database record, and by further storing Access Data for the database record in the memory of the electronic controller of the associated Controlled Object. Association as used herein between two database records is embodied by recording Access Data for a first of the associated database records in the second of the associated database records, and by further recording Access Data for the second associated database record in the first associated database record. A successful Pairing of two Controlled Objects creates an association between the two paired Controlled Objects. A communication between two associated database records or Controlled Objects can be initiated by accessing either of the associated database records or Controlled Objects.

"Reference" is the data correspondence between an identifiable database record and an identifiable Controlled Object, or between two distinct identifiable database records which may be comprised in same database or in distinct databases, wherein the reference data is recorded in only the referencing record or Controlled Object, and is not recorded in the referenced record or Controlled Object. In some embodiments reference data for a referenced database record or Controlled Object may comprise Access Data for the referenced database record or Controlled Object. A communication between a referencing data record or Controlled Object and the referenced database record or Controlled Object can only be initiated by accessing the referencing database record or Controlled Object.

"Life cycle", "life cycle facet", "facet" of a Controlled Object, as used herein, pertain to the facets of the useful life of a Controlled Object. Non-limiting examples of life cycle facets, as used herein, are Manufacture, Use and Compliance. Non-limiting Manufacture facet pertains to domains, activities and entities involved in the construction of a Controlled Object and its components, in order to embody the Useful Function of the Controlled Object. Non-limiting Use facet pertains to the domains, entities and activities associated with exercising the Useful Function of a Controlled Object. Non-limiting Compliance facet pertains to the domains, entities and activities connected with ensuring that the activities of entities associated with other facets comply with the applicable laws, regulatory requirements, industry standards, and the like. The elements of illustrative embodiments the COMS 1000 of the present invention, as they relate to the Compliance, Manufacture and Use facets, are illustrated diagrammatically in FIGS. 2-4 and are further illustrated in FIGS. 9-13. A domain, entity, database, or transaction substantially pertaining to one of the above listed facets is said herein to belong in the corresponding category of domains, entities, databases or transactions.

"Domain" means a grouping of entities that transact with each other pertaining to a specific facet of the life cycle of a Controlled Object. The illustrated domains are representatively grouped herein into three distinct categories corresponding to the Manufacture, Use and Compliance facets. This grouping is illustrative and not limiting. As used herein, the term "domain" refers interchangeably to the entities and the transactions between the entities pertaining to the associated facet of the life cycle. A database said herein to be associated with a domain should be understood to contain data substantially pertinent to the entities within the domain and to transactions and activities by and between the entities within the domain. Entities within a non-limiting illustrative Product domain in the Manufacture category may include but are not limited to vendors and purchasers of materials, components, control programs, and the like. Entities within a non-limiting illustrative Commerce domain in the Use category may include but are not limited to dealers, distributors, commercial operators, consumers and the like. Entities within a non-limiting illustrative Federal domain in the Compliance category may include but are not limited to Government agencies and organizations. It should be understood that for various embodiments of Controlled Objects, various domains and sub-domains may be pertinent to various specific facets of the life cycle of the Controlled Object. It should be further understood that entities within one domain may from time to time transact with entities within another domain. Such transactions are referred to as inter-domain transactions herein. The elements of illustrative embodiments the COMS 1000 of the present invention, as they relate to the illustrated domains in the Compliance, Manufacture and Use categories, are shown diagrammatically in FIGS. 2-4 and are further illustrated in FIGS. 9-13. Inter-domain and intra-domain transactions are further illustrated in FIG. 14.

It should be further understood that an organization may have departments or divisions that are entities in separate and distinct domains within the context of the present invention. In an illustrative example, the Federal Aviation Administration is a Government organization which has divisions that include Aircraft Certification Offices, which are entities in a domain in the Compliance category, and Air Traffic Organization which is an entity in a domain in the Use category. Similarly, an organization that is a vehicle dealer may have sales and finance departments which are entities in a domain in the Use category, and a service or repair department which is an entity in a domain in the Manufacture category. As used herein, the domain and category of an entity is determined by the primary activities of the entity as they pertain to a facet of the lifecycle of a Controlled Object, and not by any business or organizational affiliation.

"Controlled Object" means a physical object having a Useful Function, said Useful Function having at least a Material Aspect, said physical object further having an electronic controller, said electronic controller having control authority over at least a Material Aspect of said Useful Function, said control authority being embodied by execution of a control program by the electronic controller. An illustrative embodiment of a Controlled Object 10 is shown diagrammatically in FIGS. 9-13, having an electronic controller 15, said electronic controller further having Access Data 20 associated with the Controlled Object. The electronic controller 15 is further illustrated as having a control program 17 and Use Data 16. The electronic controller is further shown having Access Data 550z associated with a database record 55z, said record residing in a database in a domain within the Use category. The electronic controller 15 is further shown having Access Data comprising a URL 5101 associated with an authentication controller 50. Use Data 16 may comprise but is not limited to previously received Authorization Data, expiration countdown data, historical records of Monitored Conditions, and the like. In some embodiments, some or all Use Data 16 may be encrypted.

Non-limiting illustrative embodiments of Controlled Objects are further shown in FIG. 8, wherein some of the above disclosed details are omitted for brevity. It should be understood that an electronic controller of a Controlled Object may have Access Data associated with any number of database records or other Controlled Objects. In FIG. 8, an illustrative Controlled Object 10a is an electric vehicle, having an electronic controller 15a with control authority over an electric motor. Illustrative Controlled Objects 10b and 10c are removable battery modules having electronic controllers 15b and 15c, respectively, each having control authority over a corresponding relay.

"Useful Function" is substantially the purpose and functionality for the performance of which a physical object is designed, manufactured, operated and maintained.

"Material Aspect" is a subset of the overall Useful Function that is material to the performance of the Useful Function and which, if hindered or restricted, results in a corresponding hindrance or restriction of the Useful Function. In a non-limiting example, the Useful Function of a Controlled Object which is a vehicle is the transport of people or cargo. In said example the Material Aspects of the Useful Function may include the control of the drivetrain to facilitate or inhibit movement of the vehicle, the control of the door locking mechanisms to facilitate or inhibit ingress and egress of occupants and cargo, the control of the admission of stored energy such as liquid fuel or electric energy to facilitate or inhibit the ability to operate the drivetrain, and the like. In a non-limiting example of a Controlled Object that is a communications device such as a cellular phone, the associated Useful Function is the facilitation of electronic communication between two or more persons or electronic devices. Material Aspects of such Useful Function may include establishing a network connection, establishing a call, converting sound pressure waves to digital information, packaging the digital information for transport over a network, converting received digital information into sound pressure waves, configuring a display screen to present a user interface, and the like.

"Authorizable Aspect" means a Material Aspect that is subject to authorization and is under the control authority of the electronic controller of a Controllable Object. In some Programmed States, it may be undesirable to render some Material Aspects conditional on authorization, such as those Material Aspects related to functional safety of a Controlled Object. When used in the descriptions and disclosures made herein, the term "Authorizable Aspect" refers to a Material Aspect that is not material to functional safety, physical integrity or another critical aspect of Useful Function of a Controlled Object, in a specific Programmed State. A Material Aspect that is Authorizable in one Programmed State may be Inherent in another Programmed State. Some aspects of the Useful Function of a Controlled Object may not fall under the control authority of the electronic controller of the Controlled Object and are therefore not Authorizable but Inherent.

"Inherent Aspect" means a Material Aspect that is material to functional safety, physical integrity or another critical aspect of the Useful Function of a Controlled Object, or is not under the control authority of the electronic controller of the Controlled Object. It should be understood that a Material Aspect may be Inherent in some Programmed States, and Authorizable in other Programmed States. In a non-limiting example, the aspect of disabling a vehicle's drivetrain may be Authorizable while the vehicle is stopped (in a passive Programmed State), but Inherent while the vehicle is in motion (in an active Programmed State). Aspects of a Controlled Object's Useful Function that are not under the control authority of the associated electronic controller fall within the definition of Inherent Aspects as used herein.

"Programmed State" is a subset of the Useful Function of a Controlled Object, embodied by exercising control authority by the electronic controller of the Controlled Object responsive to execution of a control program by the electronic controller. A Programmed State may embody some Material Aspects as Authorizable and some as Inherent. A transition from a first Programmed State to a second Programmed State is referred to as an "Event" herein. In varied embodiments, some Programmed State transitions may be Controllable Events. In the disclosures and claims made herein, Programmed State is interchangeably ascribed to a Controlled Object being under the control authority of the associated electronic controller, and to an electronic controller of the associated Controlled Object. Likewise, a transition between Programmed States is interchangeably ascribed herein to a Controlled Object being under the control authority of the associated electronic controller, and to an electronic controller of the associated Controlled Object. It should be further understood that a Programmed State transition (Event) by a Controlled Object may further comprise Inherent Aspects which are not under the control authority of the electronic controller. Programmed States are classified herein as Passive and Active.

"Active State", "Active Programmed State" means a Programmed State in which at least a Material Aspect of a Controlled Object's Useful Function is enabled, and wherein said Material Aspect is controlled by the Controlled Object's electronic controller responsive to at least a Monitored Condition.

"Restricted Active State", "Restricted Active Programmed State" means an Active Programmed State in which at least a Material Aspect of a Controlled Object's Useful Function is disabled or inhibited responsive to Authorization Data, or wherein a Material Aspect of a Controlled Object's Useful Function is scheduled to be disabled or inhibited upon expiration of a countdown of calendar time or number of uses, unless an affirmative Certificate is received prior to said expiration.

"Unrestricted Active State", "Unrestricted Active Programmed State" means an Active Programmed State wherein an affirmative Certificate authorizing substantially all Material Aspects of the Useful Function has been previously received.

"Passive State", "Passive Programmed State" means a Programmed State in which substantially all Material Aspects of a Controlled Object's Useful Function are disabled or inhibited. In a Passive State, the Controlled Object's electronic controller may be powered down or in a low power condition.

"Restricted Passive State", "Restricted Passive Programmed State" means a Passive Programmed State wherein an affirmative Certificate authorizing a Material Aspect of the Useful Function has not been previously received.

"Unrestricted Passive State", "Unrestricted Passive Programmed State" means a Passive Programmed State wherein an affirmative Certificate authorizing substantially all Material Aspects of the Useful Function has been previously received.

Figure 5:
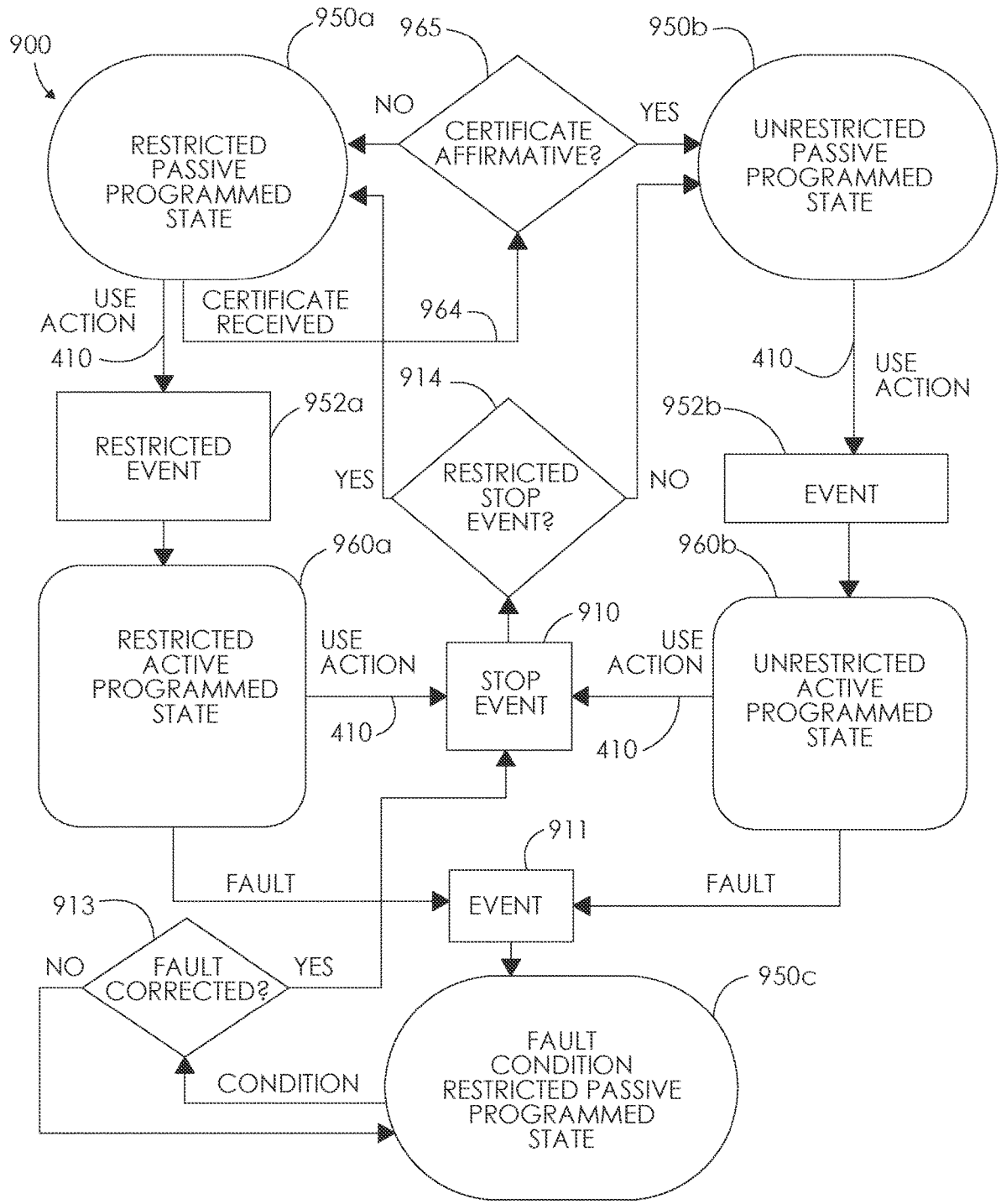
FIG. 5 diagrammatically illustrates transitions between restricted and unrestricted Passive and Active Programmed States for a Controlled Object of the present invention.
Figure 6:
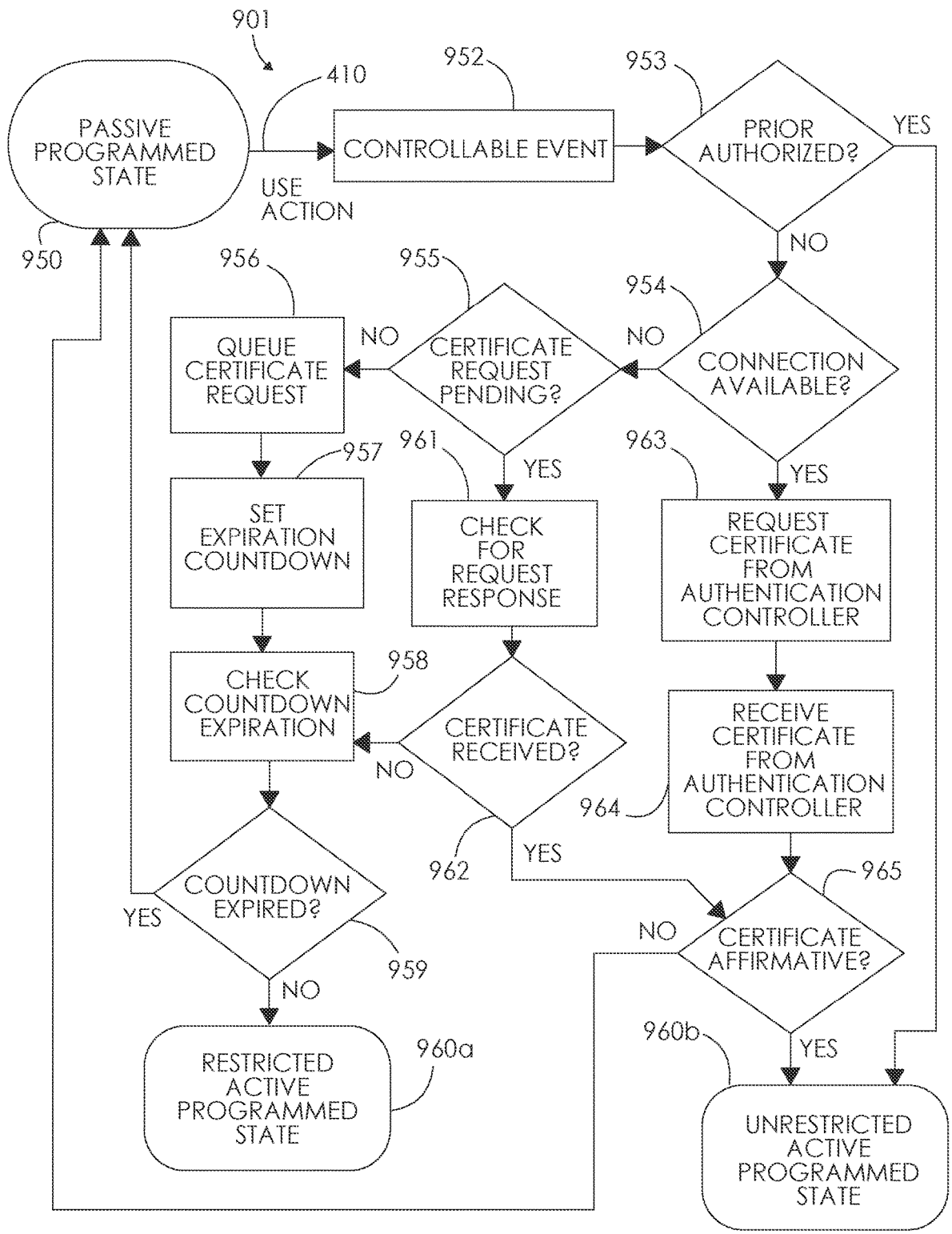
FIG. 6 is a diagram illustrating Prior, Concurrent and Subsequent receipt of Authorization Certificate and the corresponding Programmed State transitions.

Transitions between Restricted and Unrestricted, Active and Passive states are diagrammatically illustrated in FIG. 5 and are further illustrated in FIG. 6.

"Monitored Condition" is any condition pertaining to the performance of the Useful Function of a Controlled Object that is monitored by the associated electronic controller in the course of embodiment of the Useful Function. Non-limiting examples of Monitored Conditions in a vehicle are operator inputs such as steering wheel angle, accelerator pedal position, brake pedal position, brake system pressure and the like. Other non-limiting examples of Monitored Conditions for a vehicle may include velocity, acceleration, data from cameras or other sensors, amount of available stored energy, and the like. Non-limiting examples of Monitored Conditions in a battery module are bus voltage, individual battery cell voltages, battery cell temperatures, magnitude and direction of electrical current, and the like. Non-limiting examples of Monitored Conditions for a communications device include network connection status, battery state of charge, signal strength, operator input through an interface, and the like.

"Controllable Event" means a transition from a first Programmed State to a second Programmed State, initiated by a Controlled Object being under the control authority of the associated electronic controller, said transition (Event) comprising the enabling of at least an Authorizable Aspect.

"Component" means a Controlled Object having a Useful Function that is substantially a Material Aspect of the Useful Function of another Controlled Object. In a non-limiting example, an electronic controller is a Component of a Controlled Object. In another non-limiting example, a battery module for an electric vehicle is a Component of the electric vehicle. Components may be comprised in a Controlled Object releasably or substantially permanently.

"Product" means a Controlled Object having a Useful Function that is substantially utilized in transactions associated with one or more domains in the Use category. A Product may comprise a plurality of Components. A Product may itself be a Component in another Product. In a non-limiting example, a removable battery module for an electric vehicle is a Product that may be directly transacted in one or more domains in the Use category, and is also a Component of an electric vehicle whenever it is installed in the electric vehicle.

"Blockchain", "blockchain ledger", "distributed ledger" means an embodiment of a database wherein records of transactions are embodied in secure chronologically chained data blocks that inhibit tampering or alteration. In addition to data blocks pertaining to transactions, blockchain databases may comprise records referencing Tokens and may further comprise records referencing Wallets, said Wallets being data records comprising ownership and control information pertaining to Tokens.

In the context of the disclosures made herein, a Wallet is an identifiable data record representing a grouping of Tokens for purposes of recording Administrative Actions and generating Authorization Data for Use Actions. In a non-limiting example, a Wallet in a database accessed by a Compliance entity that is a State motor vehicle bureau may contain Access Data for all vehicles registered in the State. A Wallet may also be used to represent Pairings of Controlled Objects by recording Access Data for each of the paired Controlled Objects.

Some embodiments of blockchain databases may further comprise Smart Contracts (SC) to facilitate predefined transactions pertaining to Tokens. Blockchain databases are known in the arts of databases and are not described in detail herein except as they pertain specifically to the novel aspects of the present invention. Many embodiments of blockchain databases comprise multiple substantially identical copies of the data, said copies being geographically distributed. In some embodiments, a plurality of entities transacting within a domain to which the database pertains, each maintain a copy of the data that is substantially identical to copies of the data maintained by other entities in the domain.

"Token", "Non Fungible Token", "NFT" means a data record comprised within a blockchain database, said record being uniquely associated with an identifiable Controlled Object. Embodiments of Tokens, including Non Fungible Tokens referencing a physical object, are known in the arts of databases and are not described in detail herein except as they pertain specifically to the novel aspects of the present invention.

"Node" is a computing resource associated with an entity in a domain, said computing resource accessing a database associated with the domain. In embodiments utilizing blockchain technologies, a Node may participate in creation of data blocks in a blockchain database, and in validation of transactions by entities in the domain, in accordance with the methods associated with the database. Examples of such methods are known in the arts of blockchain technologies and may employ Smart Contracts. FIGS. 2-4 diagrammatically illustrate Nodes 115, 215 and 315 belonging respectively to entities 110, 210, and 310 accessing respective databases 100, 200 and 300 in domains in the respective Compliance, Manufacture and Use categories. Nodes access the corresponding databases via intra-domain communications links 70.

Many types of databases are known in the art. In the non-limiting embodiments described herein, the specific application of blockchain databases and associated technologies is disclosed. It should be understood that other embodiments, including those utilizing other types of databases, and further including those utilizing a plurality of database types, are possible without departing the scope of the present invention, and shall become apparent to those skilled in the arts based on the disclosures made herein.

As used herein, the term "Controlled Object Management System" (COMS) refers to a system of apparatus, and the corresponding computer programs associated with the apparatus, said system embodying the methods disclosed herein.

"User" means an entity in a domain in the Use category which has physical control of a Controlled Object and exercises the Controlled Object's Useful Function by means of Use Action. A User may be a commercial entity or an individual. User entity 350 is illustratively shown in FIGS. 2-4 and 13.

"Use Action" is the physical act of exercising the Useful Function of a Controlled Object. Use Action 410 is diagrammatically illustrated in FIGS. 2-6, 13 and 14.

"Administrative Action" is an action by an entity in a domain which causes Authorization Data for a Controlled Object to be entered or modified in a database associated with the domain. Non-limiting examples of Administrative Actions include issuing Product Identification Numbers, recording changes in ownership or control, assessment of fees, collection of payments, performing maintenance or repairs, and the like.

The communications topology of a non-limiting embodiment of a COMS 1000 of the present invention is shown in FIG. 2 which illustrates the communications links between various entities and the associated data records in illustrative domains in Compliance, Manufacture and Use categories. Illustrative variations of the topology are further shown in FIGS. 3 and 4. A Controlled Object 10 is shown having an electronic controller 15, said electronic controller having Access Data 20. The electronic controller 15 is shown being communicatively coupled with an authentication controller 50 via a communications link 45. In the illustrated embodiment, the authentication controller 50 is communicatively coupled to a database in the Consumer domain in the Use category via an intra-domain communications link 70. As further illustrated in FIG. 8 and FIG. 15, in some embodiments the authentication controller 50 may comprise a database. In other embodiments, the authentication controller 50 may access one or more remote databases in one or more domains. Direct access by authentication controller 50 to a database 300 in the Use category is illustrated in FIG. 2.

A plurality of non-limiting illustrative Use databases 300, in the illustrative Commerce and Consumer domains in the Use category are shown, each being accessed by a plurality of Use entities 310. Use entities are entities which exercise, manage, or facilitate the exercise of the Useful Function of Controlled Objects. Examples of Use entities may include but are not limited to commercial organizations such as vehicle fleet operators, commercial service providers, commercial sales and service organizations, as well as individuals. A plurality of Use Nodes 315 are shown, each associated with a corresponding entity 310, said nodes accessing the Use databases 300 via intra-domain communications links 70. The plurality of Use databases 300 are communicatively coupled to each other and to other databases in the illustrated COMS 1000 via inter-domain communications links 80. Inter-domain communications link may be any permanent or intermittent network connection utilizing a communications protocol.

A User entity 350 is illustrated exercising Use Action 410 over the Controlled Object 10. A User entity 350 may be an individual, an autonomous control program, or any other entity with control authority over the Controlled Object 10 to exercise the Useful Function of the Controlled Object. For example, a Controlled Object that is a Product may in some embodiments be regarded as a User entity with respect to one or more Component Controlled Objects comprised therein.

In the illustrated embodiments utilizing blockchain technologies, inter-domain communications may utilize a communications standard descriptively referred to herein as inter-domain protocol 400. A non-limiting illustrative example of an inter-domain protocol is the communications standard presented at https://ibcprotocol.org. The term "inter-domain protocol" is used herein in the most non-limiting interpretation and does not specify or imply the use of any particular communications standard. Embodiments of specific instances of inter-domain protocols 400 may differ from one another within a single embodiment of the COMS 1000 of the present invention.

Non-limiting illustrative Manufacture databases 200 in the illustrative Product and Component domains in the Manufacture category are further illustrated in FIG. 2. A plurality of Manufacture entities 210 are shown, each having an associated Manufacture Node 215 accessing the corresponding Manufacture database 200 via intra-domain communications links 70.

Also illustrated in FIG. 2 are non-limiting illustrative Compliance databases 100 in the illustrative Federal and State domains in the Compliance category. A plurality of Compliance entities 110 are shown, each having an associated Compliance Node 115 accessing the corresponding Compliance database 100 via intra-domain communications links 70.

The details of representative embodiments of databases 100, 200 and 300 are further disclosed with reference to FIG. 9 herein below. The details of transactions and communications between the various entities of the COMS 1000 of the present invention are further disclosed herein below with reference to FIGS. 10-14.

FIG. 3 shows a variation of the COMS 1000 of the present invention wherein Controlled Objects 10*a* and 10*b* are paired in Pairing 420 and are communicatively coupled via Pairing communications link 35. User entity 350 is shown exercising the Use Action 410 substantially simultaneously over the paired Controlled Objects 10*a* and 10*b*. The details of such pairing are further disclosed herein below with reference to FIG. 7, FIG. 8 and FIG. 15.

FIG. 4 illustrates an embodiment of the COMS 1000 of the present invention having a plurality of authentication controllers 50, each said authentication controller 50 accessing a plurality of databases in a plurality of domains via inter-domain communications links 80 utilizing inter-domain protocols 400.

A flow chart 900 for an embodiment of a method of transitioning a Controlled Object between various Programmed states is illustrated in FIG. 5. It should be noted that in some alternative implementations, the functions noted in the blocks may occur out of the order noted in FIG. 5, may include additional functions, and/or may omit some functions. For example, two blocks shown in succession in FIG. 5 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

FIG. 5 diagrammatically shows transitions of that may be embodied in a representative Use Cycle between illustrative examples of Programmed States for a Controlled Object. Examples of Restricted and Unrestricted Passive and Active states are illustrated. The specific steps and additional details of the illustrated transitions are further shown in FIG. 6 and FIG. 14 and further described herein below. A transition between a Restricted Passive State 950*a* and an Unrestricted Passive State 950*b* is shown via validation block 965 responsive to certificate receipt 964. The certificate receipt 964 may be responsive to a previously issued certificate request 963 (FIG. 6 and FIG. 14), or may be responsive to an Administrative Change 810 (FIG. 14).

In validation block 965 the data comprised in the received Certificate is examined to determine whether the Certificate comprises Authorization Data indicating in the affirmative. In the affirmative case the transition is made to an Unrestricted Passive State 950*b*. In the negative (the NO condition) case, the Restricted Passive State 950*a* is retained. It should be noted that the completion of the above disclosed steps may be responsive to, and substantially simultaneous with, Use Action 410 (see also FIG. 6 and FIG. 14). A Controlled Object being in an Unrestricted Passive State embodies Prior Authorization as used herein, in that an affirmative Certificate authorizing transitions to an Unrestricted Active State has been received as part of the transition to the Unrestricted Passive State. In some embodiments, an affirmative Certificate may further comprise conditions which must be met for the Certificate to remain in force. Such conditions may include retaining of a specified configuration or Pairing, performance of scheduled maintenance and the like.

Figure 14:
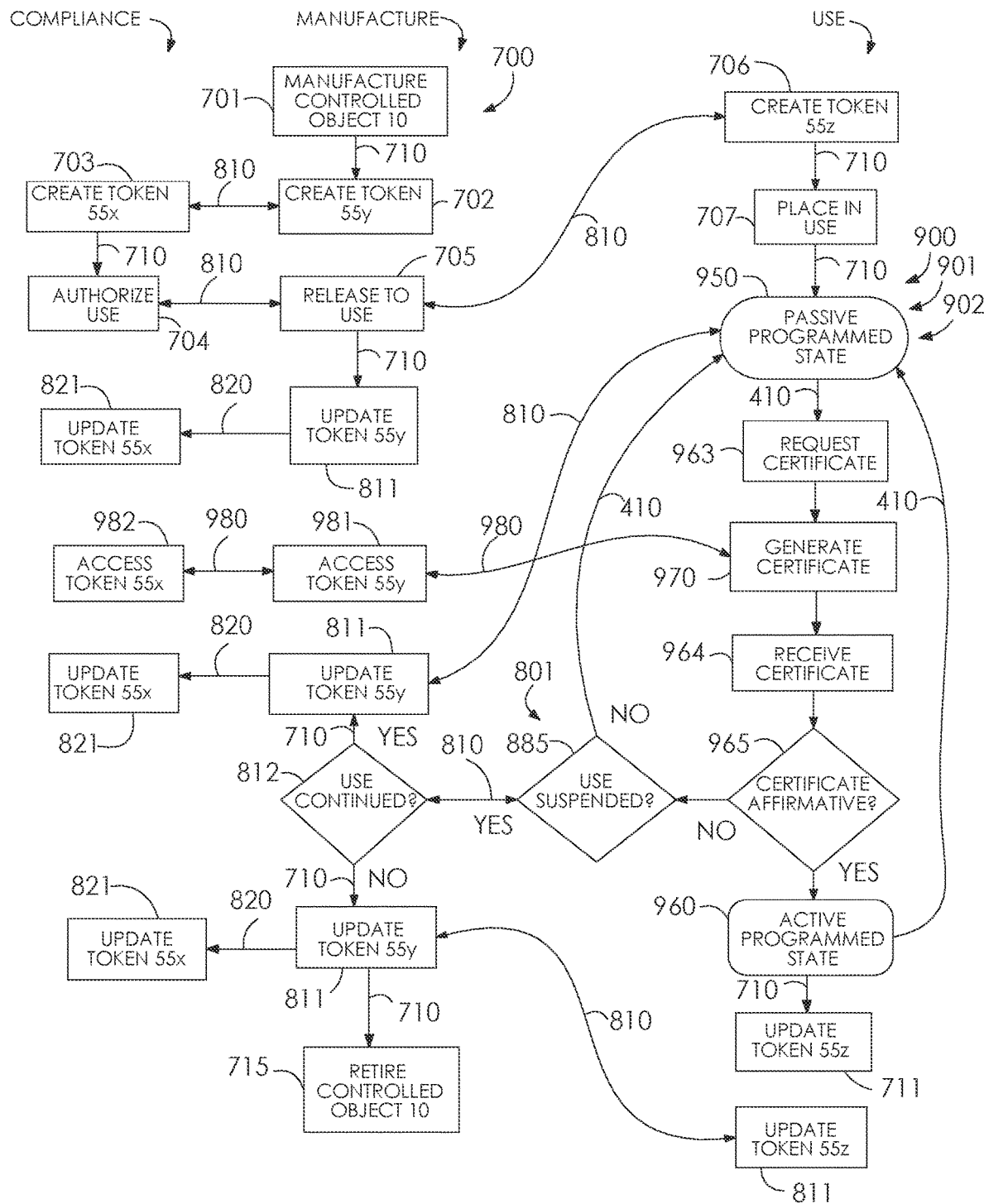
FIG. 14 is a diagram illustrating the management of the life cycle of a Controlled Object across domains in the Compliance, Manufacture and Use categories in accordance with the methods of the present invention.

If a Certificate is found to indicate in the negative (the NO condition) in block 965, a further check for suspension of use may be performed in some embodiments, as illustrated in block 885 of FIG. 14. If the determination of suspension of use is found in the affirmative in block 885, the corrective action steps illustrated in flowchart 801 may be initiated starting with block 812 of FIG. 14.

In the embodiment illustrated in FIG. 5, a transition to an Active State is initiated responsive to Use Action 410 causing a Controllable Event. A transition between a Restricted Passive State 950*a* and a Restricted Active State 960*a* is shown as a Restricted Event 952*a*, and a transition between an Unrestricted Passive State 950*b* and an Unrestricted Active State 960*b* is shown as Event 952*b*.

A Fault Event 911 is illustrated resulting in a transition to a Fault Condition Restricted Passive State 950*c*. Illustrative examples of a Fault Event may be exceeding an electrical current or temperature limit for a Controlled Object that is a battery module, a mechanical malfunction or abnormal operating condition for a Controlled Object that is a vehicle, and the like. In block 913 a determination is made whether the fault condition has been corrected. The action of block 913 may be performed periodically responsive to a schedule, responsive to a further Use Action, or other actions. In some embodiments, a determination that the fault condition has been corrected may be deemed to cause a Restricted Stop Event.

A Use Action 410 in an Active State is shown causing a Stop Event 910, which may or may not be a Controllable Event and may or may not be a Restricted Event. In block 914 a determination is made whether the Stop Event 910 is a Restricted Event. Examples of Restricted Stop Events may include a Stop Event from a Restricted Active State, or a Stop Event from an Unrestricted Active State wherein one or more conditions, if any, comprised in a previously received Certificate are no longer met. Such conditions may include a change in configuration or Pairing responsive to Use Action, requirement for scheduled maintenance, payment of fees and the like.

A Restricted Stop Event results in a transition to a Restricted Passive State 950*a*. An Unrestricted Stop Event results in a transition to an Unrestricted Passive State 950*b*.

A flow chart 901 for an embodiment of a method of transitioning a Controlled Object between various Programmed states is illustrated in FIG. 6. It should be noted that in some alternative implementations, the functions noted in the blocks may occur out of the order noted in FIG. 6, may include additional functions, and/or may omit some functions. For example, two blocks shown in succession in FIG. 6 may in fact be executed substantially concurrently, the blocks may sometimes be executed in the reverse order, or some of the blocks may not be executed in all instances, depending upon the functionality involved, as will be further clarified herein below. All such modifications and variations are intended to be included herein within the scope of this disclosure.

FIG. 6 illustrates an embodiment of the Use Cycle for a Controlled Object showing details of Prior, Concurrent and Subsequent delivery of a Certificate. The transition from a Passive State 950 is shown responsive to Use Action 410 causing a Controllable Event 952. In block 953, a determination is made whether an affirmative Certificate authorizing the Authorizable Aspect associated with the Controllable Event 952 has been previously received. If the determination is in the affirmative (the YES condition), a Prior authorization is deemed to exist and the transition is made to the Unrestricted Active State 960*b*.

If the determination in block 953 is made in the negative, the availability of a communications connection to an authentication controller is checked in block 954.

If the determination in block 954 is made in the affirmative (the YES condition), the steps for Concurrent delivery of a Certificate are carried out. A request for a Certificate is made from the Controlled Object to an available authentication controller in block 963, with reference to Access Data comprised in the electronic controller of the Controlled Object. The generation of a request for a Certificate and the referenced Access Data is further illustrated in FIG. 13. When a Certificate is received in block 964 responsive to the request for Certificate generated in block 963, the Authorization Data comprised in the received Certificate is examined in block 965. If the Authorization Data is found to indicate in the affirmative (the YES condition), the transition is made to the Unrestricted Active State 960*b*. In some embodiments, the Authorization Data may be further recorded by the electronic controller of the Controlled Object so as to be regarded as Prior authorization for subsequent Use Actions.

If the determination of block 965 is made in the negative, the transition is made to the Passive State 950.

In some embodiments, if a Certificate is found to indicate in the negative in block 965, a further check for suspension of use may be performed, as illustrated in block 885 of FIG. 14. If the determination of suspension of use is found in the affirmative (the YES condition) in block 885, the corrective action steps illustrated in flowchart 801 may be initiated starting with block 812 of FIG. 14.

If the determination of connection availability to an authentication controller in block 954 is deemed in the negative, the steps for Subsequent delivery of a Certificate are performed.

In block 955, a determination is made whether a certificate request has previously been issued and is pending. In some embodiments, a Controlled Object not having an available direct connection to an authentication controller may issue an Indirect request by transmitting it to another Controlled Object, which may be a paired Controlled Object (block 956). If the determination in block 955 is in the affirmative (the YES condition), a check for a response to the previously issued request for a Certificate is made in block 961. In some embodiments this check may be performed by communicating with another Controlled Object, which may be a paired Controlled Object. If receipt of a Certificate is confirmed in block 962, the data comprised in the received Certificate is then examined in block 965 as disclosed herein above.

Responsive to a negative determination in block 955, a request for a Certificate is issued in block 956. In some embodiments, a Controlled Object not having an available direct connection to an authentication controller may issue an Indirect request by transmitting it to another Controlled Object, which may be a paired Controlled Object. In other embodiments, a request may be added to a communications queue to be transmitted at a later time when a connection to an authentication controller may become available. Such transmission may occur at a time subsequent to completion of the Use Action 410.

In block 957, an expiration countdown is set. Many examples of expiration countdowns are known including those based on passage of calendar time, passage of active use time, number of Use Actions and the like. Setting an expiration countdown may be responsive to predetermined conditions or Use Data 16 (FIGS. 9-12) comprised in the electronic controller of the Controlled Object and the associated control program 17 (FIGS. 9-12). In some embodiments, the expiration countdown set in block 957 may correspond to expired status, causing an affirmative (the YES condition) determination in subsequent block 959. The expiration countdown status is checked in block 958 and the determination of expiration is made in block 959. An affirmative (the YES condition) determination of expiration results in the transition to the Passive State 950.

Responsive to a negative determination in block 959 the transition is made to the Restricted Active State 960*a*. In the Restricted Active State 960*a* adjustments to the expiration countdown may be made.

Figure 7:
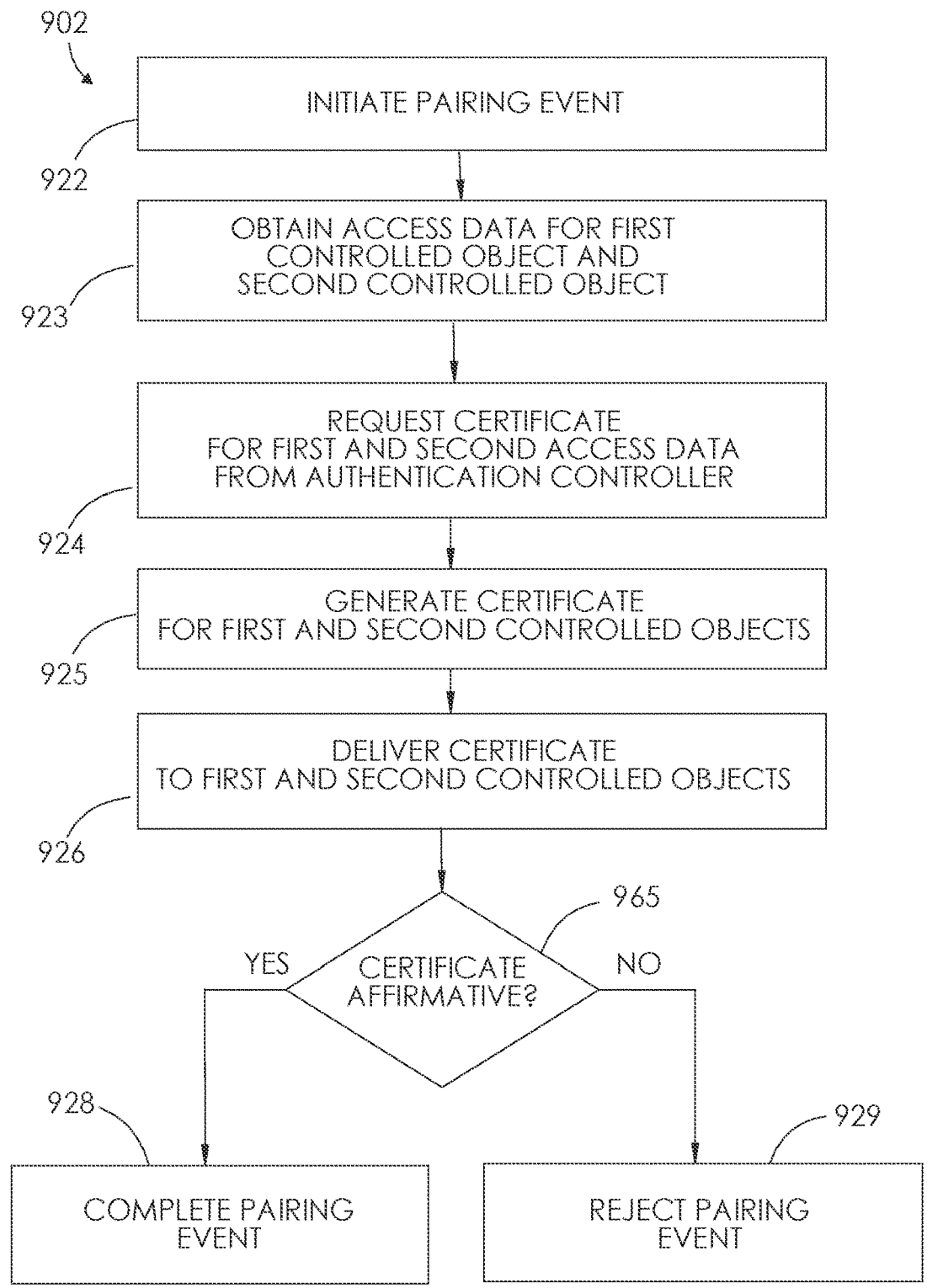
FIG. 7 is a flow diagram showing the steps of a Pairing Event of the present invention.

A flow chart 902 for an embodiment of a method of embodying a Pairing Event between two Controlled Objects is illustrated in FIG. 7. It should be noted that in some alternative implementations, the functions noted in the blocks may occur out of the order noted in FIG. 7, may include additional functions, and/or may omit some functions. For example, two blocks shown in succession in FIG. 7 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

Figure 15:
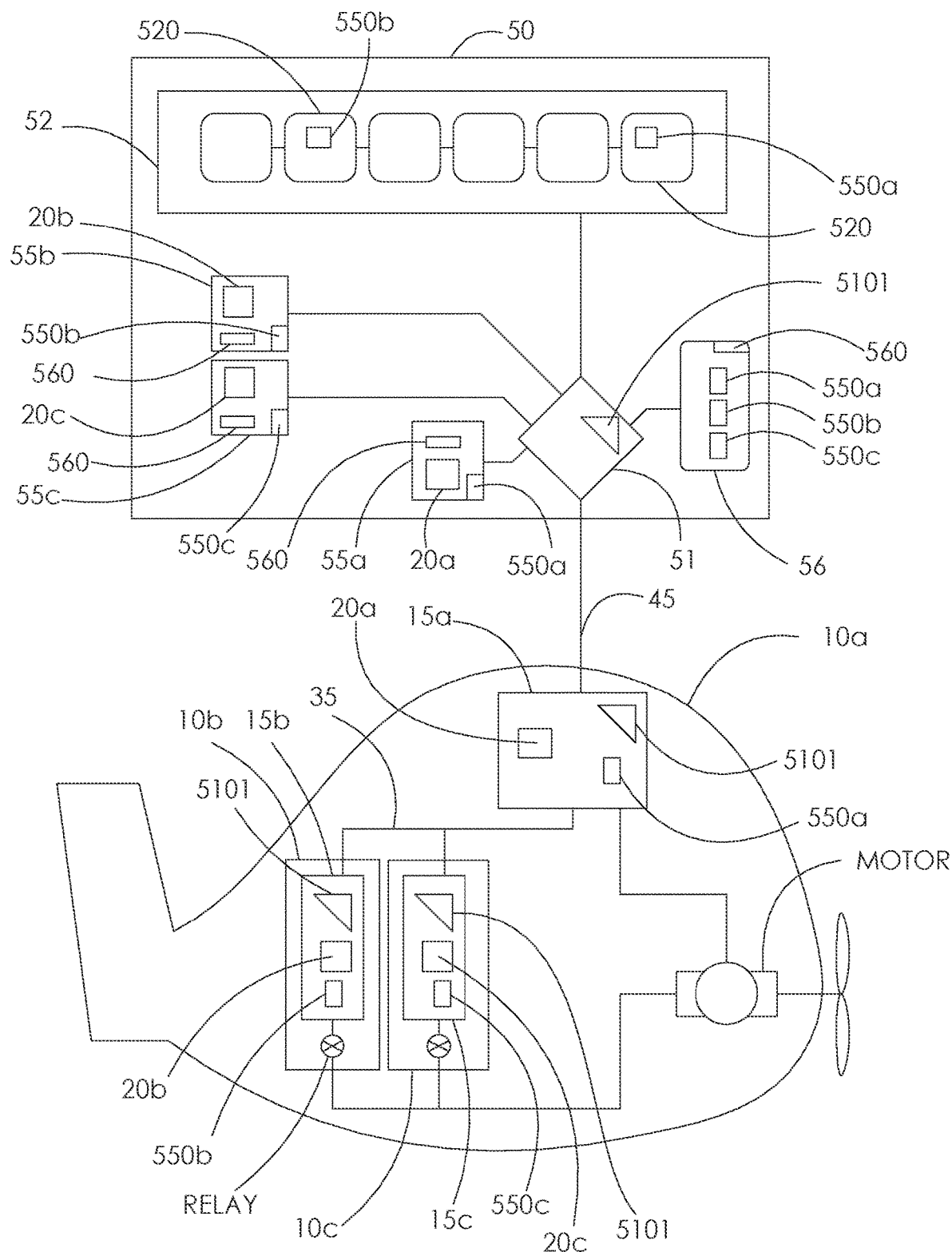
FIG. 15 illustrates a Controlled Object which is an electric aircraft having two Controlled Objects which are battery modules, said Controlled Object being communicatively coupled to an authentication controller.

The embodiment of a method for a Pairing Event illustrated in FIG. 7 is initiated in block 922. In some embodiments, a Pairing Event is initiated responsive to a Use Action 410 (FIGS. 5, 6, 13), such as installation of a Controlled Object which is a Component in a Controlled Object which is a Product. An embodiment of such installation is further illustrated in FIG. 8 and FIG. 15 showing Controlled Objects 10*b* and 10*c* which are removable battery modules (Components) being installed in Controlled Object 10*a* which is an electric vehicle (Product) in FIG. 8 and an electric aircraft (Product) in FIG. 15. In other embodiments, a Pairing Event may be initiated responsive to an Administrative Action 710 (FIGS. 10-12).

The Access Data 20*a* and 20*b* (FIGS. 4, 8) respectively for a first Controlled Object 10*a* and a second Controlled Object 10*b* is obtained in block 923. In embodiments of the method wherein the Pairing Event is responsive to a Use Action, said Access Data is obtained from the respective electronic controllers 15*a* and 15*b* of the Controlled Objects 10*a* and 10*b*. The request for a Certificate is then made in block 924 to an authentication controller 50 via communications link 45 (FIG. 8).

In embodiments wherein the Pairing Event is responsive to an Administrative Action, the Access Data is obtained from the corresponding database records 55*a* and 55*b* (FIG. 8). The request for a Certificate may then be made in block 924 by means of an Administrative Change 810 (FIGS. 10-12, 14).

A Certificate is generated in block 925 with reference to the Authorization Data recorded in one or more databases and accessing at least the records 55*a* and 55*b* (FIG. 8) associated respectively with Controlled Objects 10*a* and 10*b*. The generation of a Certificate may be Prior, Concurrent or Subsequent to the request made in block 924.

In block 926, the Certificate generated in block 925 is delivered to the first Controlled Object 10*a* and the second Controlled Object 10*b*. The delivery of the Certificate may be Direct via a communication link 45 or Indirect via Pairing link 35 (FIG. 8).

In block 965 the received Certificate is examined individually by each the first Controlled Object 10*a* and the second Controlled Object 10*b*. If both said Controlled Objects determine in the affirmative (the YES condition), the Pairing Event is completed successfully in block 928. In some embodiments such completion may be indicated by recording the Access Data 20*b* in the electronic controller 15*a* of the Controlled Object 10*a*, and by further recording the Access Data 20*a* in the electronic controller 15*b* of the Controlled Object 10*b*. A confirmation of a successful Pairing Event may further be transmitted by one or both of the Controlled Objects to the authentication controller 50 and subsequently recorded in a database. If either of the Controlled Objects determines in the negative in block 965, the Pairing Event is rejected in block 929. A notice of a rejected Pairing Event may further be transmitted by one or both of the Controlled Objects to the authentication controller 50 and subsequently recorded in a database.

In some embodiments, if a Certificate is found to indicate in the negative in block 965, a further check for suspension of use may be performed, as illustrated in block 885 of FIG. 14. If the determination of suspension of use is found in the affirmative (the YES condition) in block 885, the corrective action steps illustrated in flowchart 801 may be initiated starting with block 812 of FIG. 14.

An non-limiting illustrative embodiment of a subset of the COMS 1000 of the present invention is shown in FIG. 8 detailing an authentication controller 50 and a Controlled Object 10a which is an electric vehicle having an electronic controller 15a, said electronic controller being communicatively coupled to the authentication controller 50 by means of a communications link 45. Another non-limiting embodiment is illustrated in FIG. 15 wherein the Controlled Object 10a is an electric aircraft. In many embodiments the communications link 45 may be an Internet connection, and may employ any encryption protocols known in the arts of computer communications. It should be understood that communications link 45 may not be permanent and may be established as appropriate at various times by various known means, directly or indirectly through intervening electronic devices. A motor is shown being controllably coupled to the electronic controller 15a embodying control authority of the electronic controller 15a over the Useful Function of the electric vehicle Controlled Object 10a. The electronic controller 15a is shown having Controlled Object Access Data 20a which may comprise a vehicle identification number (VIN).

The vehicle Controllable Object 10a is further illustrated as having two Controllable Objects, 10b and 10c, which are removable battery modules, each being paired with the vehicle via pairing link 35 which is a control bus. Each battery module Controllable Object is further illustrated as having an electronic controller, 15b and 15c respectively, with a relay being controllably coupled to the corresponding electronic controller to embody the control authority of the electronic controller over the Useful Function of the corresponding battery module Controlled Object. The electronic controllers 15b and 15c are shown storing Access Data 20b and 20c respectively.

The authentication controller 50 is shown comprising an access processor 51 having a unique identifier 5101, which in many embodiments may be a Universal Resource Locator (URL), and shall be referred to as URL 5101 for brevity herein. It should be understood that any other form of unique identifier, such as a number or an alphanumeric string, may be used without departing from the scope of the invention. The authentication controller 50 is further illustrated comprising a blockchain ledger 52, said ledger further comprising a plurality of chained data blocks, each block further comprising a plurality of transaction records (not illustrated for brevity). It should be understood that an authentication controller 50 may reference one or more blockchain databases that are not comprised in the authentication controller. Such non-limiting configurations are illustrated in FIG. 2, FIG. 3 and FIG. 4. Illustrative instances of data blocks 520 are shown, illustratively comprising data referencing non-fungible token (NFT) Access Data 550a and 550b. Any data block may reference any number of NFTs.

Specific NFT instances 55b and 55c being respectively uniquely associated with the illustrated instances of battery module Controlled Objects 10b and 10c are referenced by the unique Access Data 550b and 550c, being associated respectively to the battery module Controlled Objects having Access Data 20b and 20c.

The NFT 55b is illustrated as being associated with the corresponding Controlled Object 10b by storing the Controlled Object's Access Data 20b in the NFT data structure, and by further storing the associated Access Data 550b in the NFT data structure and in the electronic controller 15b of the Controlled Object 10b. The authentication controller URL 5101 is further shown as being stored in the electronic controller 15b. The NFT 55c is similarly associated with Controlled Object 10c, and the NFT 55a is similarly associated with the vehicle Controlled Object 10a.

A wallet data record 56 is shown being associated with NFT records 55a, 55b and 55c. The association is shown as being embodied by recording the corresponding Access Data 550a, 550b and 550c in the data record 56, and further recording Access Data 560 in each of the NFT records 55a, 55b and 55c. The association establishes Authorization Data for the pairing of Controlled Objects 10b and 10c with Controlled Object 10a, said Controlled Objects being associated correspondingly with the NFT records 55b, 55c and 55a. Said Authorization Data is utilized by the authentication controller 50 to generate Authorization Certificates for the corresponding Pairing Events.

In many embodiments, a plurality of substantially identical copies of authentication controller 50 may exist, distributed over a plurality of computing resources, being accessed through a single URL 5101. Such distributed copies are well known in the arts of computer network systems and are not detailed herein.

An NFT identifier is a unique number assigned when the NFT is created (FIG. 14). Some embodiments, wherein the NFT 55 is created prior to or substantially simultaneously with the manufacture of the corresponding Controlled Object 10, may utilize the NFT identifier as the unique module ID, while others may utilize distinct identifiers for the NFT and the associated Controlled Object 10, storing both identifiers in the nonvolatile memory of the associated electronic controller 15. Storing identifiers in nonvolatile memory of a controller is known in the arts of controller design and is not illustrated in FIG. 8 for brevity. Nonvolatile memory may be of reprogrammable or one time programmable type. It should be understood that in the disclosures made herein, a reference to an identifier or other data, including data comprising an executable program, being stored or comprised in an electronic controller, or an electronic controller having a unique ID or data, indicates the referenced data being stored in the nonvolatile memory of the electronic controller unless specifically noted otherwise.

In the following disclosures with reference to FIGS. 9-12 it should be understood that accessing a database in a domain may be embodied by a plurality of Nodes belonging to a plurality of entities in the domain each accessing local and substantially identical copies of the database. Such access may be substantially simultaneous, scheduled, or coordinated in any way in accordance with the methods utilized for the database. In particular, non-limiting examples of such methods are known in the arts of blockchain technologies. The plurality of Nodes 115, 215 and 315 are shown illustratively in FIGS. 2-4 and are omitted from FIGS. 9-12 for brevity.

Figure 9:
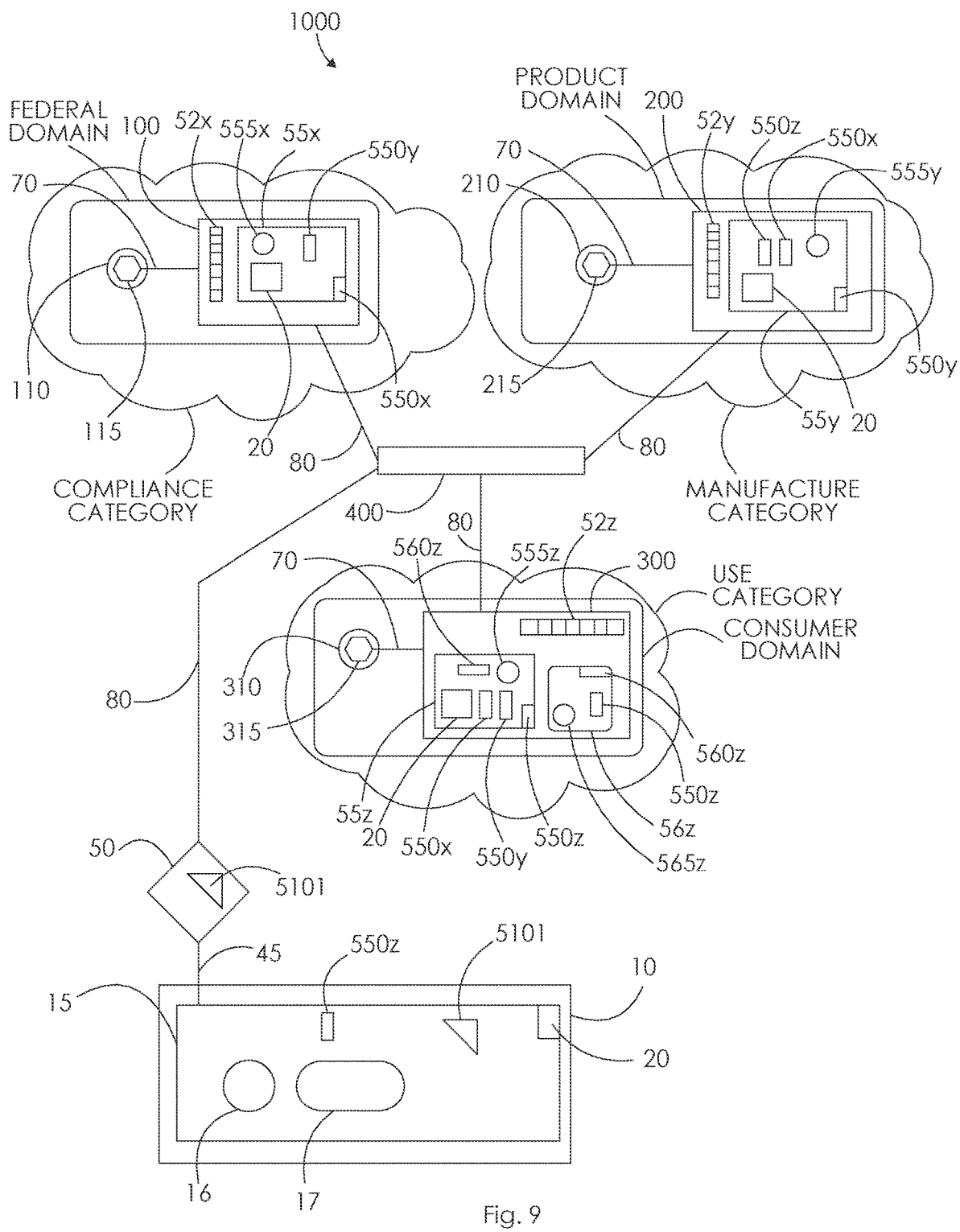
FIG. 9 is an illustrative diagram of the communications links between databases belonging to domains in Compliance, Manufacture and Use categories, and an associated Controlled Object.

FIG. 9 shows further detail of the communications topology also illustrated in FIG. 3. In each of the illustrative Compliance, Manufacture and Use categories, one illustrative domain is shown for brevity. In the Use category, an illustrative Consumer domain is shown having a Use database 300 being accessed by a Use entity 310 utilizing a Use Node 315. It should be understood that an embodiment may have a plurality of domains in each category, said domains having a plurality of databases, each said database being accessed by a plurality of entities having a plurality of Nodes. The Use database 300 is illustrated as having a ledger 52z, an identifiable database record 55z which may be a Token, and an identifiable database record 56z which may be a wallet. The association of database record 55z with Controlled Object 10 is shown by said database record 55z comprising the Access Data 20 associated with said Controlled object, and is further shown by the electronic controller 15 of the Controlled Object 10 having Access Data 550z that is associated with database record 55z.

The association of database record 55z and database record 56z is shown by said database record 55z having Access Data 560z associated with said database record 56z, and is further shown by said database record 56z having Access Data 550z associated with database record 55z.

An illustrative Product domain in the Manufacture category is shown as having a Manufacture database 200 being accessed by a Manufacture entity 210 utilizing a Node 215. Manufacture database 200 is shown having a ledger 52y and a database record 55y which may be a Token. Representation of a database record 56 is omitted from the illustration of Manufacture database 200, however it should be understood that every illustrated feature of Use database 300 may also be present in a Manufacture database 200, and may also be present in a Compliance database 100 which is herein illustrated in a representative Federal domain in the Compliance category. Association between a first database record and a second database record is shown as said first database record having Access Data of said second database record, and said second database record having Access Data of said first database record. Association between a database record and a Controlled Object is shown as said database record having Access Data of said Controlled Object, and said Controlled Object having Access Data of said database record.

A reference between a database record and a Controlled Object is shown as said database record having the Access Data associated with said Controlled Object, and said Controlled Object not having Access data associated with said database record. In the embodiment illustrated in FIG. 9, an association exists between records 55x and 55y, between records 55y and 55z, between records 55z and 56z, and between record 55z and Controlled Object 10. In the illustrated embodiment a reference exists from record 55x to Controlled Object 10, from record 55z to record 55x, and from record 55y to Controlled Object 10.

Database records 55x, 55y, 55z and 56z are further illustrated as having metadata 555x, 555y, 555z and 565z respectively. Said metadata may include but is not limited to Authorization Data, use history data, and the like. Metadata of a Token in blockchain technologies may reside on-chain comprised in the blockchain database records, or off-chain wherein metadata is stored separately from the blockchain database records, with the Token comprising Access Data for locating and accessing the off-chain metadata. Modifications to on-chain metadata are recorded in the data blocks of the blockchain database. Modifications to off-chain metadata may or may not be recorded in the data blocks of the blockchain database, subject to embodiment by the Smart Contracts associated with the Token. All such embodiments of metadata and variations thereof are collectively referred to as metadata herein and are illustrated as being comprised in the Token for brevity.

The transaction flow responsive to an Administrative Action 710 by an entity 110 accessing a Compliance database 100 is shown in FIG. 10. An Administrative action is an action by an entity in a domain resulting in a corresponding change in Authorization Data associated with an identifiable database record, a group of identifiable database records, or an identifiable Controlled Object. Responsive to an Administrative Action, associations between a plurality of database records in a plurality of databases, or between one or more database records and one or more Controlled Objects, may be created, modified, suspended or revoked. In the embodiment illustrated in FIG. 10, metadata 555x comprised in database record 55x is modified responsive to Administrative Action 710 and the transaction is recorded in ledger 52x. Responsive to the modification of metadata 555x, the Access Data of the associated database record 55y is used to access said database record 55y via Administrative Change 810. An Administrative Change is a two-way communication, requiring acknowledgement, between a first database in a first domain and a second database in a second domain, wherein metadata in an identifiable data record comprised in said second database must be modified responsive to modification of metadata in an associated identifiable database record comprised in said first database. The illustrated metadata 555y is shown as being modified responsive to Administrative Change 810.

An Administrative Notice 820 is further illustrated being transmitted responsive to modification of metadata 555y and the association of database records 55y and 55z, utilizing Access Data 550z. An Administrative Notice is a one-way communication, not requiring acknowledgement, between a first database in a first domain and a second database in a second domain, wherein metadata in an identifiable data record comprised in said second database may be modified responsive to modification of metadata in an associated or referencing identifiable database record comprised in said first database.

Illustrative non-limiting transaction flow responsive to an Administrative Action by an entity 210 modifying metadata 555y of a database record 55y is diagrammatically shown in FIG. 11. The transaction is shown as being recorded in ledger 52y, and Administrative Changes 810 are shown being effected resulting in the modification of metadata 555x and 555z in the associated database records 55x and 55z, respectively.

FIG. 12 is a non-limiting diagrammatic illustration of transaction flow responsive to an Administrative Action by an entity 310 modifying metadata 565z of record 56z, which may be a Wallet. Such Administrative Action may be effecting a change in ownership or control of the associated database record 55z, which may be a Token, and thereby the Controlled Object 10 associated with database record 55z. The transaction is shown being recorded in ledger 52z. Administrative Notices 820 are shown being transmitted to databases 200 and 100 to facilitate modification of the associated database records 55y and 55x if needed. Also illustrated is n Administrative Notice 820 being transmitted from database 200 to database 100 responsive to modification of data 555y in record 55y, said modification being responsive to receipt of Administrative Notice 820 from database 100. The illustrated transaction flow results in the receipt of two separate Administrative Notices, from databases 200 and 300, by the database 100. The illustrated duplication allows for additional validation of reported changes.

Figure 13:
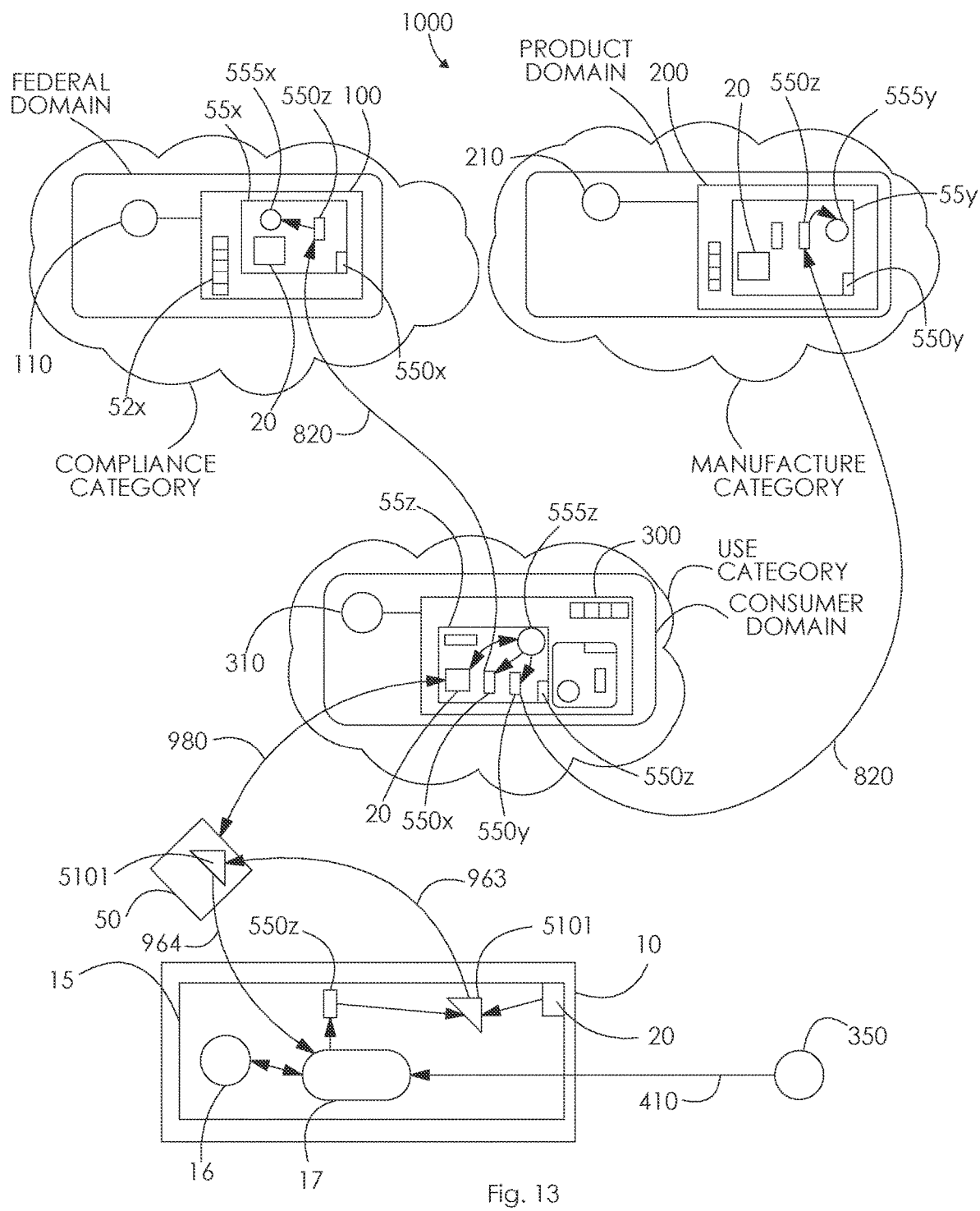
FIG. 13 illustrates the flow of information responsive to a request for an Authentication Certificate by a Controlled Object, said request being responsive to a Use Action.

FIG. 13 shows a non-limiting transaction flow responsive to a Use Action 410 directed by User 350 at a Controlled Object 10. The inputs of User Action 410 are processed by the electronic controller 15 executing control program 17. Responsive to the execution of the control program 17, Use Data 16 is accessed to determine whether Use Action 410 constitutes a Controllable Event. FIG. 13 shows the transaction flow responsive to said determination being made in the affirmative (the YES condition). The Access Data 550z recorded in the electronic controller 15 responsive to a prior association of Controlled Object 10 with database record 55z is retrieved, along with Access Data 20 identifying the Controlled Object 10. Access Data 5101 for authentication controller 50 is used to transmit a Certificate request 963 to authentication controller 50, said Certificate request 963 comprising said Access Data 550z and said Access Data 20. Authentication controller 50 is shown performing Authorization Data access 980 to database 300 utilizing Access Data 20 and Access Data 550z comprised in the Certificate request 963. Responsive to Authorization Data access 980, Authorization Data 555z is accessed and may be modified. Administrative Notices 820 are further illustrated being transmitted to databases 100 and 200. All the illustrated transactions may be recorded in one or more associated ledgers in each database. This recording of transactions is known in the art of databases and is not illustrated in FIG. 13 for brevity.

Responsive to the accessed Authorization Data 555z, a Certificate is generated by the authentication controller 50 resulting in Certificate receipt 964 by the electronic controller 15 of the Controlled Object 10. Illustrative methods that may be embodied by control program 17 to effect the transactions illustrated in FIG. 13 are further shown in FIGS. 5, 6, 7 and 14.

A plurality of flow charts for an embodiment of a COMS 1000 of the present invention are illustrated in FIG. 14. Details of flow charts 900, 901 and 902 are further illustrated in FIG. 5, FIG. 6 and FIG. 7 respectively. It should be noted that in some alternative implementations, the functions noted in the blocks may occur out of the order noted in FIG. 14, may include additional functions, and/or may omit some functions. For example, two blocks shown in succession in FIG. 14 may in fact be executed substantially concurrently, the blocks may sometimes be executed in the reverse order, or some of the blocks may not be executed in all instances, depending upon the functionality involved, as will be further clarified herein below. All such modifications and variations are intended to be included herein within the scope of this disclosure.

The blocks in FIG. 14 are arranged in columns corresponding to transactions between entities in domains in Compliance, Manufacture and Use categories, embodying the corresponding facets of the life cycle of a Controlled Object. The transactions in the Compliance column are to be understood to take place substantially between Compliance entities 110 (FIGS. 2-4) utilizing Compliance Nodes 115 to access records in one or more databases 100. The transactions in the Manufacture column are to be understood to take place substantially between Manufacture entities 210 (FIGS. 2-4) utilizing Manufacture Nodes 215 to access records in one or more databases 200. The transactions in the Use column are to be understood to take place substantially between Use entities 310 (FIGS. 2-4) utilizing Use Nodes 315 to access records in one or more databases 300. A Use Action 410 by a User 350 may cause transactions in one or more domains as shown in FIG. 13. Block 885 is to be understood to comprise actions taking place substantially in the Use category.

The flow diagram 700, starting with block 701 and ending with block 707, illustrates a method of the present invention of placing a Controlled Object 10 that is a Product (FIGS. 2-4, FIGS. 9-13) into use. At block 701, the Controlled Object is manufactured by one or more entities in the Manufacture category. As used herein, the term "manufacture" includes but is not limited to fabrication, assembly, configuration, generating and storing a control program for an electronic controller, generating and storing a unique Product Identification Number (PIN) and generating and storing Access Data 20 (FIGS. 9-13) in the electronic controller 15 of the Controlled Object 10. One or more Component Controlled Objects may be installed in and paired with the Controlled Object 10 during the manufacture step of block 701. Non-limiting illustrative example of manufacturing a Controlled Object that is a Product is the manufacture of an electric vehicle 10a (FIG. 8). The vehicle chassis, motor, and electronic controller 15a are assembled. A Vehicle Identification Number (VIN) is assigned and stored in the electronic controller 15a as Access Data 20a. The removable battery modules 10b and 10c are installed. In another non-limiting example of manufacturing a Controlled Object that is a Product is the manufacture of an aircraft, which may be human-piloted or autonomous. For an electric aircraft, battery modules 10b and 10c are installed. Additional Component Controlled Objects such as communication and navigation equipment (not illustrated) may be installed.

Upon completion of the manufacturing process, an Administrative Action 710 by a Manufacturing entity responsible for the completion of actions in block 701 is issued to create an identifiable data record 55a (FIGS. 8, 15) in a Manufacture category database 200 (FIGS. 2-4). Said identifiable data record is further shown as record 55y in FIG. 11. Said identifiable data record 55a (55y in FIG. 11) is further associated in block 702 with the Controlled Object 10a (10 in FIG. 11) in accordance with the disclosures made herein above, and the transactions are recorded in a ledger 52y in a database 200 (FIG. 11). An Administrative Change 810 is initiated with a database 100 (FIG. 11) to create an identifiable data record 55x and to further associate records 55x and 55y in block 703. Authorization for use is determined and issued in block 710 responsive to an Administrative Action 710 by a Compliance entity 110 (FIG. 10). This may include verifying the certifications of the Manufacture entity 210 which completed blocks 701 and 702, the certifications of the design of the Controlled Object 10 such as a type certificate for an aircraft or a vehicle, and the like. Upon authorization of use in the Compliance domain, an Administrative Change 810 is initiated by a Compliance entity 110 and processed by a Manufacture entity 210 (FIG. 10) in block 705. Transactions of block 705 may include updates to configuration of Controlled Object 10, administrative transactions such as issuance of a certificate of airworthiness for an aircraft, manufacturer's certificate of origin (MCO) for a vehicle, pre-delivery tests, and the physical transfer of the Controlled Object 10 to a Use entity 310 in a domain of the Use category.

Upon completion of block 705, Administrative Action 710 is issued updating Authorization Data 555y of the associated record 55y in block 811. The transactions of block 705 are recorded in ledger 52y and may further be recorded in ledger 52x in some embodiments, as well as updating Authorization Data 555x in block 821 responsive to Administrative Notice 820.

An Administrative Change 810 is further issued to a Use entity 310 to create at block 706 an identifiable database record (Token) 55z, and to further associate said Token 55z with Token 55y and to further associate Token 55z with Controlled Object 10, said associations being embodied as disclosed herein above. Upon completion of block 706, an Administrative Action 710 is issued initiating transactions at block 707. Any number of transactions may take place at block 707 including a plurality of physical and administrative transfers of the control of Token 55z and the associated Controlled Object 10 between a plurality of Use entities 310 which may be in a plurality of Use domains. All such transactions and the corresponding modifications of Token 55z and one or more ledgers 52z (FIG. 12) are comprised in and represented by block 707 of FIG. 14. Upon completion of transactions at block 707, the Controlled Object 10 is considered ready for regular use as disclosed in, but not limited to, flow charts 900, 901, 902 as further illustrated in FIGS. 5, 6 and 7, respectively, and described herein above, and in flow chart 801. A variation of flow charts 900, 901 and 902 is shown at block 970 of FIG. 14, illustrating Authorization Data access 980 accessing Token 55$y$ in a database of Manufacture category at block 981 and further accessing Token 55$x$ in a database of Compliance category in block 982. It should be understood that such access may be Prior, Concurrent or Subsequent, as illustrated in FIG. 6 and detailed in the corresponding descriptions herein above. In embodiments of Prior access, Authorization Data originating in a Compliance database 100 and/or Authorization Data originating in a Manufacture database 200 may be stored in Authorization Data 555$z$ of the record 55$z$ in a Use database 300 responsive to transactions illustrated in FIGS. 10 and 11.

The flow chart 801 of FIG. 14, starting with block 885, should be understood to be a variation or modification of flowcharts 900, 901 and 902 detailed herein above. Responsive to a negative determination in Certificate examination in block 965, a further check is performed at block 885 to determine if the negative indication in block 965 is responsive to a suspension of use recorded in the accessed Authorization Data responsive to an Administrative Action 710 by a Compliance entity 110, a Manufacture entity 210 or a Use entity 310 (FIGS. 10-13). Non-limiting examples of such suspensions may include a safety recall for a vehicle, and airworthiness directive for an aircraft, the expiration of an expiration countdown, non-payment of a fee or tax, and the like.

If suspension of use is determined in the affirmative (the YES condition), corrective action may be undertaken at block 812. As illustrated in FIG. 14, block 812 is shown comprising actions in the Manufacture category. Such actions may include periodic maintenance or repair for an aircraft or vehicle, replacement of a malfunctioning Component which may be another Controlled Object, and the like. It should be understood that for some suspensions of use, and in particular those relating to non-payment of a fee or transfer of ownership or control, the corrective actions of block 812 may take place in the Use category. Corrective actions in Use category may include but are not limited to obtaining proof of payment of a fee or tax, obtaining proof of ownership or control, obtaining proof of intent to transfer, and the like.

Responsive to a successful corrective action at block 812, the Authorization Data is updated at blocks 811 and 821, and the Controlled Object 10 is returned to regular use at block 950.

In the event that corrective action at block 812 is not successful, the Authorization Data is updated at blocks 811 and 812 to reflect discontinuation of use. The Controlled Object 10 is then physically retired from service at block 715.

Continuation in Part Disclosure

In some embodiments, it may be advantageous to create a pairing of a Controlled Object and an Authorizer. As used herein, an "Authorizer" is an embodiment of a Controlled Object having the Useful Function of, upon successful pairing with a second Controlled Object, facilitating the authorization of transitions between programmed states by the second Controlled Object. The Useful Function of an Authorizer is referred to herein as "Authorizer Function". The Material Aspect of the Authorizer Function is the secure receipt, secure storage, and secure transmission of Access Data and other data. In some embodiments said secure receipt and secure transmission of data may be by means of a secure message.

In some embodiments, an Authorizer may only have the Authorizer Function, In other embodiments, an Authorizer may further have one or more additional Useful Functions, which may or may not be exercised simultaneously with the Authorizer Function. An example of an Authorizer may be a Radio Frequency Identifier (RFID) tag securely storing a Certificate. Another example of an Authorizer may be a mobile phone or another electronic communications device securely storing a Certificate. Another example of an Authorizer may be an electronic navigation device securely storing a Certificate. Other embodiments of an Authorizer shall become apparent to those skilled in the art based on the disclosures made herein. All such embodiments, modifications and variations are intended to be included herein within the scope of this disclosure and protected by the following claims.

With reference to FIG. 3 and FIG. 4, in some embodiments the Controlled Object 10$a$ may have the Authorizer Function, and the Controlled Object 10$b$ may be the paired second Controlled Object. In other embodiments, Controlled Object 10$b$ may have the Authorizer Function, and the Controlled Object 10$a$ may be the paired second Controlled Object.

Figure 16:
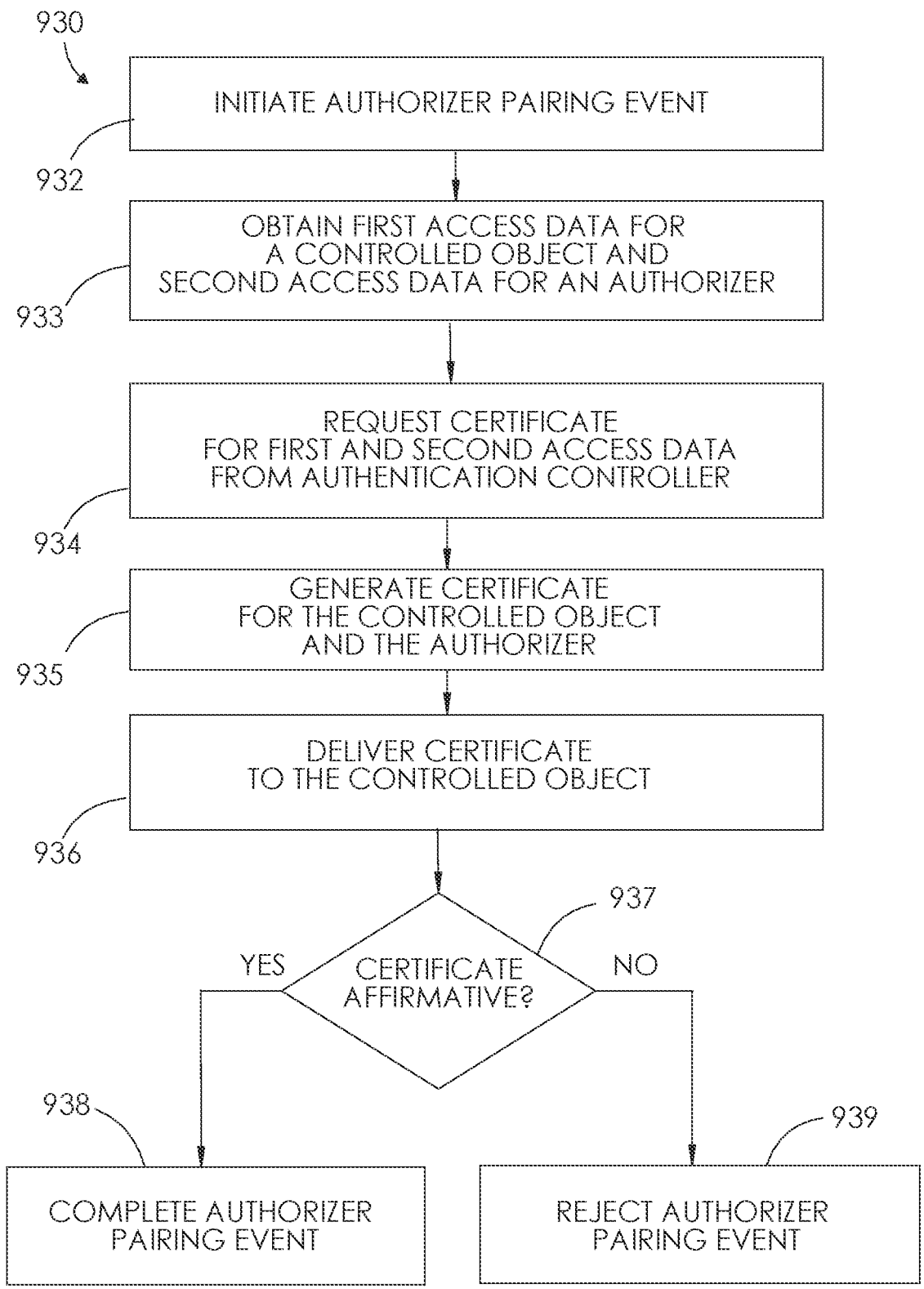
FIG. 16 is a flow diagram showing the steps of an Authorizer Pairing Event of the present invention.

A flow chart 930 for a method of embodying a Pairing Event between two Controlled Objects, with one of the Controlled Objects having the Authorizer Function, and correspondingly referred to herein as the Authorizer, is illustrated in FIG. 16. This type of Pairing Event is referred to herein as an "Authorizer Pairing Event". It should be noted that in some alternative embodiments, the functions noted in the blocks may occur out of the order noted in FIG. 16, may include additional functions, and/or may omit some functions. For example, two blocks shown in succession in FIG. 16 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure and to be protected by the claims.

The embodiment of a method for an Authorizer Pairing Event illustrated in FIG. 16 is initiated in block 932. In some embodiments, an Authorizer Pairing Event is initiated responsive to a Use Action 410 (FIG. 5, 6, 13), such as installation of a Controlled Object which is a Component in a Controlled Object which is a Product. An embodiment of such installation is further illustrated in FIG. 8 and FIG. 15 showing Controlled Objects 10$b$ and 10$c$ which are removable battery modules (Components) being installed in Controlled Object 10$a$ which is an electric vehicle (Product) in FIG. 8 and an electric aircraft (Product) in FIG. 15. It should be noted that in such embodiments, either or both of the paired Controlled Objects may have the Authorizer Function, in addition to one or more other Useful Function. For example, an electric vehicle Controlled Object may have the Authorizer Function of authorizing the transition of a battery module Controlled Object to an active programmed state. Conversely, a battery module Controlled object may have the Authorizer Function of authorizing the transition of an electric vehicle Controlled Object to an active programmed state.

In other embodiments, an Authorizer Pairing Event may be initiated responsive to an Administrative Action 710 (FIG. 10-12).

In embodiments of the method wherein the Authorizer Pairing Event is responsive to a Use Action, said the record Access Data 550*a* and 550*b* for the associated identifiable data records 55*a* and 55*b* may be obtained from the respective electronic controllers 15*a* and 15*b* of the Controlled Objects 10*a* and 10*b* (FIG. 8). In such embodiments the record Access Data is obtained at block 933. The request for a Certificate is then made in block 934 to an authentication controller 50 via communications link 45 (FIG. 2-4, 8).

In embodiments wherein the Authorizer Pairing Event is responsive to an Administrative Action, the Access Data 20*a* and 20*b* for the Controlled Objects 10*a* and 10*b* is obtained from the corresponding identifiable data records 55*a* and 55*b* at block 933 (FIG. 2-4, 8). The request for a Certificate may then be made in block 934 by means of an Administrative Change 810 (FIG. 10-12, 14).

A Certificate is generated in block 935 with reference to the Authorization Data recorded in one or more databases and accessing at least the identifiable data records 55*a* and 55*b* associated respectively with Controlled Objects 10*a* and 10*b* (FIG. 2-4, 8). The generation of a Certificate may be Prior, Concurrent or Subsequent to the request made in block 934. A Certificate may, in some embodiments, be digitally signed by the Authentication Controller which generates the Certificate.

In embodiments where one or both of the identifiable data records 55*a* and 55*b* are Non Fungible Tokens (NFTs), the generation of a Certificate may be accomplished at least in part by the execution of a Smart Contract associated with each NFT. Smart Contracts are executable computer programs that are linked to the NFT in accordance with the methods practiced in the arts of blockchain technologies.

In block 936, with further reference to FIGS. 2-4 and 8, the Certificate generated in block 935 is delivered to the first Controlled Object 10*a* and the second Controlled Object 10*b*. The delivery of the Certificate may be Direct via a communication link 45 or Indirect via Pairing link 35.

In block 937 the received Certificate is examined individually by each the Controlled Object and the Authorizer. If both said Controlled Object and said Authorizer determine in the affirmative (the YES condition), the Authorizer Pairing Event is completed successfully in block 938. In some embodiments such completion may be indicated by recording the Access Data in the electronic controller of the Controlled Object, and by further recording the Access Data in the electronic controller of the Authorizer. A confirmation of a successful Authorizer Pairing Event may further be transmitted by one or both of the Controlled Objects and the Authorizer to the authentication controller 50 (FIG. 2-4, 8) and subsequently recorded in a database.

If either of the Controlled Object and the Authorizer determines in the negative in block 937, the Authorizer Pairing Event is rejected in block 939. The rejection of the Authorizer Pairing Event may be embodied by making a record of the rejection by the electronic controllers of one or both the Controlled Object and the Authorizer. A notice of a rejected Pairing Event may further be transmitted by one or both of the Controlled Object and the Authorizer to the authentication controller 50 (FIG. 2-4) and subsequently recorded in a database.

Figure 17:
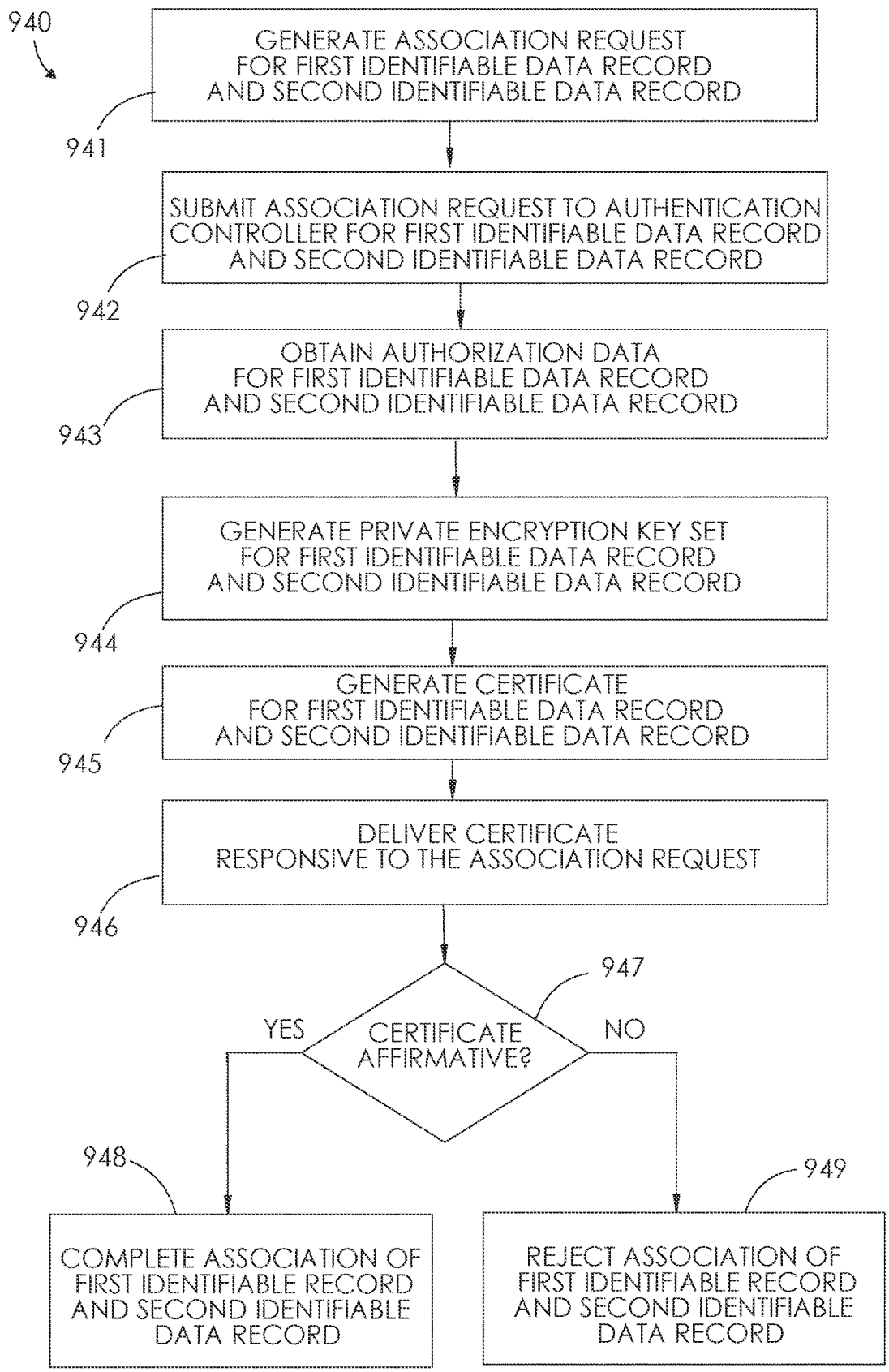
FIG. 17 is a flow diagram showing the steps of an Association Event between identifiable data records of the present invention.

The methods of the present invention disclosed herein utilize Association of identifiable data records. A non limiting example of a method for such Association is illustrated in FIG. 17. The corresponding apparatus, entities, and data are further illustrated in FIG. 18.

A flow chart 940 presented in FIG. 17 illustrates the steps for a non-limiting method of Association between two identifiable data records of the present invention. An Association of identifiable data records may, in some embodiments, be carried out responsive to an Administrative Change 810 (FIG. 14, FIG. 10, FIG. 11). It should be noted that in some alternative embodiments, the functions noted in the blocks may occur out of the order noted in FIG. 17, may include additional functions, and/or may omit some functions. For example, two blocks shown in succession in FIG. 17 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure and to be protected by the claims.

As used in the following disclosure and the corresponding claims, the terms "Record Administrator" and "Administrator" of an identifiable data record refer interchangeably to a computing resource having controlling access to the identifiable data record. "Controlling access" is defined herein as having the ability and authority to modify at least a portion of the data of the identifiable data record. Controlling access may, in some examples, be embodied by having a unique identifier of the Administrator, which may be a URL or a numerical identifier, recorded in a blockchain database as the owner of the identifiable data record.

In other examples, controlling access may be embodied by storing at least a portion of the data of the identifiable data record in a memory or other data storage medium that is only accessible to the Administrator.

Figure 18:
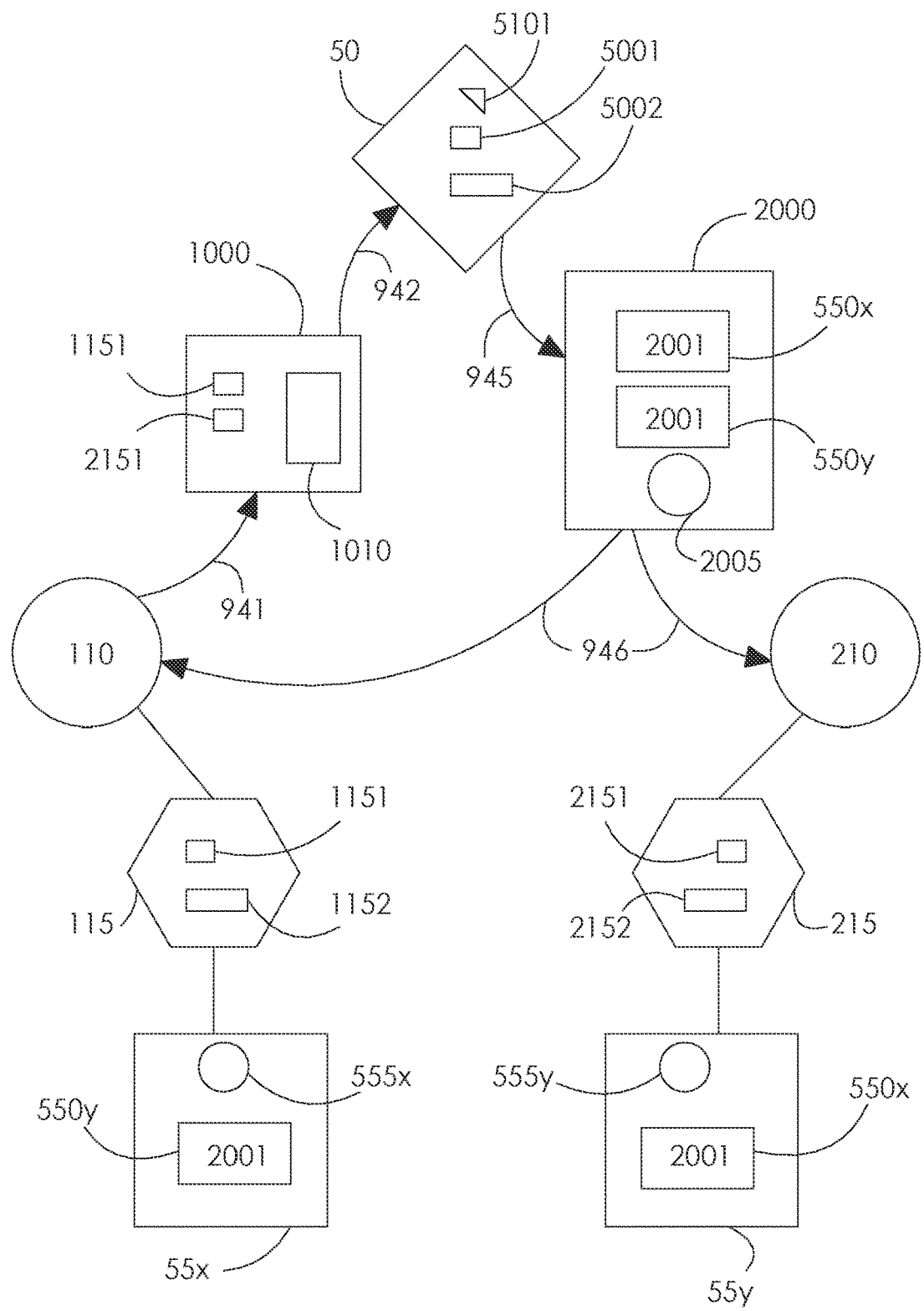
FIG. 18 is a diagrammatic illustration of the entities and data relating to an Association between two identifiable data records.

FIG. 18 illustrates an entity 110 (also with reference to FIG. 2-4) operating a first Administrator Node 115 having controlling access to a first identifiable data record 55*x*, and an entity 210 operating a second Administrator Node 215, said second Administrator Node having controlling access to a second identifiable data record 55*y*. In some embodiments, entity 210 may be the same entity 110. In some embodiments, Administrator Node 215 may be the same Administrator Node 115. Such variations and modifications shall become apparent to those skilled in the art based on the disclosures made herein, and are omitted from FIG. 18 for brevity.

In some embodiments, the Administrator of an identifiable data record may make one or more public encryption keys available to a second computing resource. An illustrative example of such keys is shown in FIG. 18, with the first Administrator Node 115 having a first public key 1151, a second Administrator Node 215 having a second public key 2151. The illustrated Administrator Nodes are further shown having private keys 1152 and 2152, respectively corresponding to the public keys. The public keys 1151 and 2151 are shown being made available to the Authentication Controller 50 via Association Request 1000.

Such public encryption keys may be used by the second computing resource to encrypt secure messages pertaining to the identifiable data record, that may only be decrypted by the Administrator of the identifiable data record with a corresponding private encryption key. The public encryption keys may further be used by the second computing resource to decrypt, or to verify the authenticity of, secure messages pertaining to the identifiable data record, that have been encrypted or digitally signed with a private encryption key of the Administrator.

With illustrative reference to FIG. 2-4, Nodes 115, 215 and 315 are Administrators for identifiable data records contained in the respective databases 100, 200 and 300. FIG. 9 further illustrates such identifiable data records 55$x$, 55$y$, and 55$z$ being accessed respectively by Nodes 115, 215 and 315, which are the Administrators for the corresponding records within the scope of the present disclosure. In a non limiting illustrative example shown in FIG. 18, a first Administrator is illustrated as Node 115 having controlling access of a first identifiable data record 55$x$, and a second Administrator is illustrated as Node 215 having controlling access of a second identifiable data record 55$y$.

It should be understood that in the context of the present invention, the data stored in an electronic controller 15 (FIG. 9) of a Controlled Object 10 collectively constitutes an identifiable data record that is identified by a PIN or other unique identifier associated with the Controlled Object, as disclosed herein. Examples of such data may include, but are not limited to, Use Data 16, URL 5101, Access Data 550$z$, Access Data 20, executable program 17, and the like, as illustrated in FIG. 9. The electronic controller 15 is to be considered the Administrator of the collective identifiable data record contained therein. In the present disclosure, the term "Administrator" refers equally and interchangeably to Administrators that are Nodes, electronic controllers, or any other computing resource having controlling access to the respective identifiable data record, without limitation of where and by what means the identifiable data record may be stored.

It should be further understood that in some embodiments, and in particular those employing blockchain technologies, controlling access may be embodied via submitting, by the Administrator of an identifiable data record, modifications to the data of the identifiable data record to be committed to a data block of the corresponding blockchain, in accordance with the methods practiced in the arts of blockchain technologies. In some embodiments the identifiable data record may be a Token, and may further be a Non Fungible Token (NFT), and the controlling access may further be embodied at least in part by execution of a Smart Contract linked with the Token, in accordance with the methods practiced in the arts of blockchain technologies.

To initiate an Association of the first identifiable data record 55$x$ and a second identifiable data record 55$y$, at block 941 of the flowchart 940 (FIG. 17), entity 110 generates an Association Request 1000. The Association Request 1000 is illustrated as having the public key 1151 of the first Administrator Node 115, the public key 2151 of the second Administrator Node 215, and Request Data 1010. In some embodiments, Request Data 1010 may contain descriptions of functionality, restrictions, limitations, identifiers, addresses, and other data pertaining to the details of the requested Association. The Association Request 1000 is submitted to the Authentication Controller 50 at block 942.

The Authentication Controller 50 is illustrated as having a unique identifier which is a URL 5101. The Authentication Controller 50 is further illustrated as having a public encryption key 5001, and a private encryption key 5002. In some embodiments, the Authentication Controller 50 may have a database 52 (FIG. 9, FIG. 15), and may further have identifiable data records such as 55$a$, 55$b$, 55$c$, and 56 that pertain to existing authorizations and Associations between records. Such variations and modifications shall become apparent to those skilled in the art based on the disclosures made herein, and are omitted from FIG. 18 for brevity. Such database and/or identifiable records, and other data, collectively referred to herein as Authorization Data, are accessed by the Authentication Controller 50 at block 943 (FIG. 17). A Certificate 2000 is then generated at block 944 by the Authentication Controller 50 responsive to the Authorization Data.

A private encryption key set 2001 is generated by the Authentication Controller 50 at block 944. In some embodiments the key set 2001 may be one or more symmetric keys, one or more pairs of asymmetric keys, or any other key set known in the arts of encryption. Metadata 2005 may also be generated by the Authentication Controller 50 responsive to the Request Data 1010 and the Authorization Data.

Responsive to the Authorization Data indicating in the affirmative for the requested Association, the key set 2001 is a valid key set, and the metadata 2005 indicates the data pertinent to a successful Association of the identifiable data record 55$x$ and the identifiable record 55$y$. Responsive to the Authorization Data indicating in the negative, the key set 2001 may be a null or invalid key set, and the metadata 2005 may contain data pertinent to a rejected Association of the two identifiable data records.

A Certificate 2000 is generated by the Authentication Controller 50 at block 245, said Certificate containing Access Data 550$x$ which is to be used to access the identifiable record 55$x$ in subsequent transactions pursuant to the Association authorized by the Certificate 2000. The Access Data 550$x$ may be encrypted by the Authentication Controller 50 using the public key 2151, so as to only be readable by the Administrator Node 215 utilizing the corresponding private key 2152. The Certificate 2000 further contains Access Data 550$y$ which is to be used to access the identifiable record 55$y$ in subsequent transactions pursuant to the Association authorized by the Certificate 2000. The Access Data 550$y$ may be encrypted by the Authentication Controller 50 using the public key 1151, so as to only be readable by the Administrator Node 115 utilizing the corresponding private key 1152.

The Certificate 2000 may, in some embodiments, be further encrypted or digitally signed by the Authentication Controller 50 utilizing the private key 5002. In such embodiments, the Certificate 2000 may be decrypted or validated by any computing resource, utilizing the public key 5001.

At block 946 (FIG. 17, FIG. 18) the Certificate 2000 is delivered to the requesting entity 110. In embodiments wherein entities 110 and 210 are distinct entities, the Certificate 2000 may also be delivered to the entity 210. The delivery of Certificate 2000 may be by any known means and may be substantially instantaneous, or delayed either pursuant to a predetermined schedule or on as-available basis. The delivery of Certificate 2000 to the intended recipients may be direct or through intervening devices or networks.

At block 947, the Administrator Node 115 examines the data of Certificate 2000. In embodiments where the Administrator Node 215 is distinct from the Administrator Node 115, the data of Certificate 2000 is also examined by the Administrator Node 215. Such examinations may take place substantially simultaneously, or at distinct points in time.

Responsive to the data of the Certificate 2000 indicating in the affirmative, the Access Data 550$y$ of the identifiable data record 55$x$ is modified by the Administrator Node 115 with a valid key set 2001, and the metadata 555$x$ is modified responsive to Certificate metadata 2005 at block 948. Likewise, the Access Data 550$x$ of the identifiable data record 55$y$ is modified with a valid private key set 2001, and the metadata 555$y$ is modified responsive to Certificate metadata 2005 at block 948 to complete a successful Association between identifiable data records 55$x$ and 55$y$. The valid private key set 2001 may subsequently be used for encrypting and decrypting secure messages exchanged between the Administrator Node 115 and the Administrator Node 215, said secure messages being responsive to the successful Association between the identifiable data records 55$x$ and 55$y$. Such secure messages may be used to securely verify the validity of the Association, to facilitate enabling or disabling of Material Aspects of the Useful Function of one or more Controlled Objects, to exchange Use Data, or other data.

Responsive to the data of the Certificate 2000 indicating in the negative, the Access Data 550$y$ of the identifiable data record 55$x$ is modified by the Administrator Node 115 with an invalid or null key set 2001, and the metadata 555$x$ is modified responsive to Certificate metadata 2005 at block 949. Likewise, the Access Data 550$x$ of the identifiable data record 55$y$ is modified with an invalid or null key set 2001, and the metadata 555$y$ is modified responsive to Certificate metadata 2005 at block 949 to reject an unsuccessful Association between identifiable data records 55$x$ and 55$y$. In some embodiments, the modification of data in records 55$x$ and 55$y$ responsive to a negative indication of Certificate 2000 may be partial or full erasure of the corresponding Access Data in one or both of the identifiable data records. The invalid or null private key set 2001 will prevent secure messages from being generated responsive to the unsuccessful Association between identifiable data records 55$x$ and 55$y$.

It should be emphasized that the above-described embodiments of the methods and apparatus of the present invention are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

Therefore, having thus described the invention, at least the following is claimed:

1. A method of associating a first identifiable data record and a second identifiable data record, said method comprising:
    generating an Association Request by a first Administrator having controlling access to the first identifiable data record, the first Administrator having an associated first public encryption key and a first private encryption key, said Association Request comprising the first public encryption key, and request data defining association parameters, said request data being encrypted with the first private encryption key;
    submitting the Association Request to an Authentication Controller having an associated second public encryption key and a second private encryption key;
    decrypting, by the Authentication Controller, using the first public encryption key, the request data comprised in the Association Request;
    generating, by the Authentication Controller, a private encryption key set for secure communications referencing the first identifiable record and the second identifiable record, said private encryption key set having a first portion associated with the first identifiable record and a second portion associated with the second identifiable record;
    generating by the Authentication Controller responsive to the request data, a first Certificate comprising:
        access data for the first and the second identifiable data records, said access data being encrypted using the second private encryption key,
        the second public encryption key, and
        the first portion of the private encryption key set, being further encrypted using the first public encryption key;
    delivering the first Certificate to the first Administrator;
    decrypting, by the first Administrator, the access data, using the second public encryption key;
    decrypting, by the first Administrator, the first portion of the private encryption key set using the first private encryption key; and
    storing by the first Administrator, the decrypted access data and the decrypted first portion of the private encryption key set in a data storage medium accessible only to the first Administrator.

2. The method of claim 1, said second identifiable data record having a second Administrator, having controlling access to the second identifiable data record, the second Administrator having a third private encryption key and a third public encryption key, said method further comprising:
    obtaining, by the Authentication Controller, the third public encryption key from the second Administrator;
    generating by the Authentication Controller, responsive to the request data a second Certificate comprising:
        access data for first and the second identifiable data records, said access data being encrypted using the second private encryption key,
        the second public encryption key, and
        the second portion of the rate encryption key set being further encrypted using the third public encryption key;
    delivering the second Certificate to the second Administrator;
    decrypting, by the second Administrator, the access data, using the second public encryption key;
    decrypting by the second Administrator, the second portion of the private encryption key set, using the third private encryption key; and storing, by the second Administrate, the decrypted access data and the decrypted second portion of the private encryption key set in a data storage medium accessible only to the second Administrator.

3. The method of claim 2, wherein the first portion of the private encryption key set is identical to the second portion of the private encryption key set.

4. The method of claim 2, said method further comprising subsequent to delivering the first Certificate to the first Administrator and subsequent to delivering the second Certificate to the second Administrator:
- encrypting a secure message by the originating one of the first Administrator and the second Administrator, utilizing the portion of the private encryption key set stored by the originating Administrator;
- transmitting the secure message by the originating one of the first Administrator and the second Administrator to the receiving one of the first Administrator and the second Administrator;
- decrypting the secure message by the receiving one of the first Administrator and the second Administrator, utilizing the portion of the private encryption key set stored by the receiving Administrator.

5. The method of claim 1, wherein at least one of the first identifiable data record and the second identifiable data record is a Non Fungible Token (NFT).

* * * * *